United States Patent
Abitbol et al.

(10) Patent No.: US 6,692,127 B2
(45) Date of Patent: Feb. 17, 2004

(54) SPECTACLES FITTING SYSTEM AND FITTING METHODS USEFUL THEREIN

(75) Inventors: Marc Abitbol, Jerusalem (IL); Ran Sasson, Mazkeret-Batya (IL); Ofer Mosenzon, Moshav Netaim (IL)

(73) Assignee: Visionix Ltd., Jerusalem (IL)

( * ) Notice: Subject to any disclaimer, the term of this patent is extended or adjusted under 35 U.S.C. 154(b) by 72 days.

(21) Appl. No.: 09/859,603

(22) Filed: May 17, 2001

(65) Prior Publication Data

US 2003/0123026 A1 Jul. 3, 2003

Related U.S. Application Data

(60) Provisional application No. 60/205,210, filed on May 18, 2000.

(51) Int. Cl.[7] .................................................. A61B 3/04
(52) U.S. Cl. ..................... 351/227; 351/246; 345/419; 705/26
(58) Field of Search .................. 351/204, 227, 351/228, 231–233, 246, 247; 345/418–420, 427, 581, 582, 619, 646, 649, 660; 356/601; 702/1, 5, 150–153; 705/26, 27

(56) References Cited

U.S. PATENT DOCUMENTS

| | | | | |
|---|---|---|---|---|
| 4,944,585 A | * | 7/1990 | Mizuno | 351/204 |
| 4,957,369 A | * | 9/1990 | Antonsson | 356/608 |
| 5,592,248 A | * | 1/1997 | Norton et al. | 351/246 |
| 5,691,799 A | * | 11/1997 | Ramachandran | 351/204 |
| 5,926,247 A | * | 7/1999 | Kimura | 351/41 |
| 5,983,201 A | * | 11/1999 | Fay | 705/27 |
| 6,095,650 A | * | 8/2000 | Gao et al. | 351/227 |
| 6,142,628 A | * | 11/2000 | Saigo | 351/204 |
| 6,222,621 B1 | * | 4/2001 | Taguchi | 351/169 |
| 6,233,049 B1 | * | 5/2001 | Kondo et al. | 356/623 |
| 6,286,957 B1 | * | 9/2001 | Livnat | 351/204 |
| 6,466,892 B2 | * | 10/2002 | Fujii et al. | 345/418 |
| 6,512,518 B2 | * | 1/2003 | Dimsdale | 345/427 |

FOREIGN PATENT DOCUMENTS

WO   WO 9729441 A1  *  8/1997 .......... G06F/17/60

* cited by examiner

Primary Examiner—George Manuel
Assistant Examiner—John R. Sanders, Jr.
(74) Attorney, Agent, or Firm—Abelman, Frayne & Schwab

(57) ABSTRACT

A spectacles fitting system including a wide-view imaging system operative to provide a wide-view of a client's face, a 3D image processor operative to generate first 3D information describing the client's physical features, a virtual try-on unit operative to receive the digital 3D representation of the client's face and a digital 3D representation of a spectacle frame, to virtually mount the spectacle frame onto the client's face and to generate second 3D information describing frame/facial fit, and a lens fitter operative to receive the first 3D information and the second 3D information and to generate therefrom at least one parameter for face-and-frame customized manufacture and cutting of the lens.

25 Claims, 44 Drawing Sheets

FIG. 8A

| PARAMETER | - GLOBAL PARAMETERS LIKE PATH TO MTX FILES LOCATION | |
|---|---|---|
| PARAMNAME | VARCHAR(255), PK | PARAMETER NAME |
| PARAMVALUE | VARCHAR(255) | PARAMETER VALUE |

FIG. 8B

| LOCALPARAMETER | | |
|---|---|---|
| LOCALPARAMNAME | VARCHAR(255), PK | PARAMETER NAME |
| LOCALPARAMVALUE | VARCHAR(255) | PARAMETER VALUE |

FIG. 8C

| LOGINLOG | - TABLES THAT RECORDS LOGS OF REGISTERED CLIENTS | |
|---|---|---|
| LOGINLOGID | INT, PK | ID OF LOGIN RECORD |
| LOGINTIME | DATETIME | LOGIN |
| CLIENTID | VARCHAR(255) | ID OF CLIENT |
| CLIENTIP | VARCHAR(15) | IP FROM WHICH THE CLIENT CONNECTED |

FIG. 8D

| LANGUAGE | LINK TABLE BETWEEN FIELDS THAT CAN APPEAR ON DIFFERENT LANGUAGES AND TRANSLATION TABLE | |
|---|---|---|
| REFLANGUAGE | TINYINT, PK, IDENTITY | ID OF LANGUAGE |
| LANGUAGENAME | VARCHAR(15) | LANGUAGE NAME |

FIG. 8E

| TRANSLATION | TABLE OF FIELDS NAMES/VALUES TRANSLATIONS TO DIFFERENT LANGUAGES | | |
|---|---|---|---|
| REFTRANSLATION | INT, IDENTITY, PK | | ID OF TRANSLATION |
| LANGUAGEID | TINYINT, FKTRANSLATION_LANGUAGEID _REFLANGUAGE | U N I Q U E | ID OF LANGUAGE |
| TABLENAME | VARCHAR(128) | | NAME OF TABLE |
| FIELDNAME | VARCHAR(50) | | NAME OF FIELD, FOR WHICH TRANSLATION IS PROVIDED |
| KEYFIELDVALUE | VARCHAR(255) | | VALUE OF KEY FIELD FOR THE TABLE THAT NEEDS TRANSLATION. |
| TRANSLATION | NVARCHAR(255) | | TRANSLATION OF FIELD VALUE |

FIG. 8F

| RESOLUTION | TABLE OF RESOLUTIONS IN FOR WHICH THE SITE IS CREATED | |
|---|---|---|
| REFRESOLUTION | TINYINT, PK, IDENTITY | ID OF RESOLUTION |
| RESOLUTIONNAME | VARCHAR(15) | RESOLUTION NAME |

FIG. 8G

| IMAGE | TABLE OF IMAGES FOR DIFFERENT RESOLUTION VERSIONS | | |
|---|---|---|---|
| REFIMAGE | INT, IDENTITY, PK | | ID OF IMAGE |
| RESOLUTIONID | TINYINT FKIMAGES_RESOLUTIONID _REFRESOLUTION | | ID OF RESOLUTION |
| TABLENAME | VARCHAR(128) | | NAME OF TABLE |
| FIELDNAME | VARCHAR(50) | U N I Q U E | NAME OF FIELD, FOR WHICH IMAGE IS PROVIDED (IF THERE IS MORE THEN 1 IMAGE IN THE REFERENCED TABLE); OR TO GIVE A NAME A SAVED IMAGE |
| SUBFIELD | TINYINT, DEFAULT 1 | | IF FOR THE SAME TABLE, THE SAME FIELD AND THE SAME KEY WE HAVE MORE THAN 1 IN THIS FIELD. DEFAULT IS 1. |
| KEYFIELDVALUE | VARCHAR(255) | | VALUE OF KEY FIELD FROM THE REFERENCED TABLE. |
| LANGUAGEID | TINYINT, FK_IMAGES_LANGUAGES DEFAULT 0 | | ID OF THE LANGUAGE ON WHICH THE TEXT ON THE ICON IS WRITTEN (IF IT IS) |
| IMAGE | IMAGE | | IMAGE FILE |

FIG. 8H

| CHAIN | - TABLE OF CHAINS THAT USE 3DIVIEW SERVICES | |
|---|---|---|
| REFCHAIN | SMALLINT, PK, IDENTITY | CHAIN ID IN THE SYSTEM |
| CHAINNAME | VARCHAR(50) | CHAIN NAME ON ENGLISH |
| CHAINABBREVIATION | VARCHAR(4) | CHAIN ABBREVIATION |
| LANGUAGEID | TINYINT, FK_CHAIN_LANGUAGE | WHAT LANGUAGE IS A DEFAULT FOR THE SITE OF THIS CHAIN |

FIG. 9A

| AGEGENDERCHAIN | TABLE OF AGE AND GENDER CATEGORIES BY CHAIN. USED FOR FRAME MODELS, CLIENTS AND MODEL FACES | |
|---|---|---|
| REFAGEGENDER | SMALLINT, PK, IDENTITY | ID OF AGE GENDER CATEGORY |
| CHAINID | SMALLINT FKAGEGENDER_CHAINED_ REFCHAIN | ID OF CHAIN, THAT DEFINED CATEGORY |
| AGEGENDERNAME | VARCHAR(40) | NAME OF THE AGEGENDER CATEGORY |
| AGERANGELOW | TINYINT, NOT NULL | THE LOWEST AGE FOR THE CATEGORY |
| AGERANGEHIGH | TINYINT | THE HIGHEST AGE FOR THE CATEGORY |
| GENDER | CHAR (1), CHECK IN NOT NULL | GENDER: F=FEMALE, M=MALE, U=UNISEX |

FIG. 9B

| SHOP | - TABLE OF SHOPS OF EACH CHAIN, LISTED IN CHAINS TABLE - FOR GUEST CLIENTS AND IT WILL SHOW MODEL FACES | |
|---|---|---|
| REFSHOP | INT, PK, IDENTITY (1029,1) | SHOP ID IN THE SYSTEM |
| CHAINID | SMALLINT, NOT NULL FKSHOPS_CHAINED_REFCHAIN | ID OF THE CHAIN TO WHICH THE SHOP BELONGS. |
| CHAINSHOPNAME | VARCHAR(50), NULL | SHOP NUMBER/NAME IN THE CHAIN. IF IT IS GUEST SHOP, THE NAME WILL BE |
| SHOPADDRESS | VARCHAR(150), NULL | ADDRESS OF THE SHOP (MANDATORY EXCEPT GUEST) |
| SHOPSTATEID | SMALLINT, NULL FKSHOPS_SHOPSTATEID_REFSTATE | ID OF THE STATE (MANDATORY EXCEPT GUEST) |
| SHOPCITYID | INT, NULL, FKSHOPS_SHOPCITYID_REFCITY | ID OF THE CITY (MANDATORY EXCEPT GUEST) |
| SHOPCITYNAME | VARCHAR(50), NULL | NAME OF THE CITY (TEMPORARY) |
| SHOPCOUNTRYID | TINYINT, NULL, FKSHOPS_SHOPCOUNTRYID_REFCOUNTRY | ID OF THE COUNTRY (MANDATORY EXCEPT GUEST) |
| SHOPZIPCODE | INT | ZIP CODE (MANDATORY EXCEPT GUEST) |
| SHOPTELEPHONE | VARCHAR(30) | PHONE NUMBER OF THE SHOP |
| SHOPFAX | VARCHAR(30) | FACSIMILE NUMBER OF THE SHOP |
| SHOPEMAIL | VARCHAR(128) | EXISTS |
| INHERITFROM | INT, NULL, FKSHOPS_INHERITFROM_SHOPID | ID OF THE SHOP, THIS SHOPS INHERITS BUSINESS DATA |
| SHOPSTATUSID | TINYINT, DEFAULT 2 FK_SHOP_SHOPSTATUS | ID OF SHOP STATUS (INTERNER, REGULAR, CLOSED) |

FIG. 9C

| SHOP | | TABLE OF SHOPS OF EACH CHAIN, LISTED IN CHAINS TABLE |
|---|---|---|
| | | FOR GUEST CLIENTS AND IT WILL SHOW MODEL FACES |
| SHOWPRICES | TINYINT, CHECK IN (0,1), DEFAULT 1 | IF ON THE INTERNET / KIOSK PRICES WILL BE SHOWN |
| SHOPUPDATE | NULL | AUTOMATIC OR MANUAL UPDATE. IF AUTOMATIC, ALL THE DATA IS COPIED FROM MAIN SHOP (TRIGGER). IF MANUAL, A MESSAGE HAS TO APPEAR UPON LOGIN TO THE ADMIN UTILITY IN THE SHOP. |
| UPDATEFLAG | TINYINT, DEFAULT 0, CHECK IN (0,1), NOT NULL | THE FIELD IS UPDATED BY TRIGGER AFTER THE TABLES OF MAIN SHOP WAS UPDATED AND IS OFF AFTER THE UPDATE AUTOMATIC OR MANUAL WAS COMPLETE OR THE SHOP ADMINISTRATOR PUT THE FLAG OFF (TILL THE NEXT UPDATE) |

FIG. 9D

| PRICERANGE | TABLE OF PRICE RANGES BY CHAINS, SHOWN ON SITE | |
|---|---|---|
| REFPRICERANGE | SMALLINT, PK, IDENTITY | ID OF PRICE RANGE |
| SHOPID | INT, NOT NULL FKPRICERANGE_SHOPID_ REFSHOP | ID OF SHOP TO WHICH PRICE RANGE BELONGS |
| LOWRANGE | DECIMAL (9,2) | THE LOWEST PRICE IN THE RANGE |
| HIGHRANGE | DECIMAL (9,2) | THE HIGHEST PRICE IN THE RANGE |
| LABEL | VARCHAR (255) | LABEL SHOWN OF MAIN SELECTION PAGE (ENG) |

FIG. 9E

| CLIENT | TABLE OF CLIENTS(END-USERS) OF ALL THE SHOPS IN ALL THE CHAINS | |
|---|---|---|
| REFCLIENT | VARCHAR(255), PK | CLIENT ID IN THE SYSTEM; IN THE POS, THIS VALUE WILL BE DEFINED MANUALLY INSIDE THE RANGE OF IDS THAT IT WAS GIVEN BY SERVER. RANGE BORDERS ARE KEPT IN SHOPS TABLE. |
| CHAINCLIENTID | INT | ID ASSIGNED TO CLIENT BY CHAIN (THROUGH ADDPOWER, ETC) |
| SHOPID | INT, NOT NULL, FKCLIENTS_SHOPID_REFS HOP | ID OF THE SHOP, THAT THE CLIENT SIGNED IN IT |
| LOGIN | VARCHAR (255), NOT NULL, UNIQUE | LOGIN NAME (EMAIL OF CLIENT). IF GUEST, EQUAL REFCLIENT |
| PASSWORD | VARCHAR (8), NOT NULL | IF GUEST, EQUAL REFCLIENT. |
| EMAILSTATUSID | TINYINT, DEFAULT 2 FK_CLIENT_EMAILSTATUS | IF AN EMAIL IS FICTIVE, NON-ACTIVE OR ACTUAL |
| ROPASSWORD | VARCHAR (8), NULL | READ-ONLY PASSWORD FOR FRIENDS AND RELATIVES OF THE HAVE TO ASSIGN ROPASSWORD BUT AN ENTRY TO THE SYSTEM WITH EMPTY ALLOWED. |
| SALUTATION | NVARCHAR(5) NULL | SALUTATION (MR., MS., MRS., DR..) |

FIG. 9F

| CLIENT | TABLE OF CLIENTS(END-USERS) OF ALL THE SHOPS IN ALL THE CHAINS | |
|---|---|---|
| FIRSTNAME | NVARCHAR(10), NOT NULL | CLIENTS FIRST NAME, FOR GUEST, IT WILL WILL BE USED TO DEFINE IF THE USER IS GUEST OR CLIENT. |
| MIDDLENAME | NVARCHAR (20) NULL | CLIENTS MIDDLE NAME |
| LASTNAME | NVARCHAR (20), NOT NULL | CLIENTS LAST NAME, FOR GUEST, IT WILL |
| BIRTHYEAR | SMALLINT, NOT NULL, | LINK TO THE TABLE OF AGES AND GENDERS; IF GUEST, EQUAL 0 |
| CLIENTGENDER | NULL | M- MALE; F-FEMALE |
| CLIENTFRAMESIZE | VARCHAR (11) NULL | SIZE OF FRAMES OF THE CLIENT |
| CURRENTFACE2DID | INT, NULL, FKCLIENTS_CURRENTFACE2D REFCLIENTFACE | ID OF THE 2D IMAGE OF THE DEFAULT 3D FACE |
| CREATIONDATE | DATETIME DEFAULT (GETDATE()) | DATE OF 1ST CREATION OF |

FIG. 9G

| EMAILSTATUS | STATUS OF EMAIL ADDRESS OF CLIENT | |
|---|---|---|
| REFEMAILSTATUS | TINYINT, PK | ID OF EMAIL STATUS |
| EMAILSTATUS | VARCHAR(20) | NAME OF EMAIL STATUS |

FIG. 9H

| PRESCRIPTIONS | PRESCRIPTIONS DATA PER CLIENT (SYNCHRONIZED WITH ADD POWER DB) | |
|---|---|---|
| CLIENTID | VARCHAR(255), PK FKPRESCRIPTIONS_CLIENTID_REFCLIENT | CLIENT ID |
| ODSPHERE | DECIMAL(9,2), NOT NULL DEFAULT 0.00 | SPHERE IN RIGHT EYE |
| OSSPHERE | DECIMAL(9,2), NOT NULL DEFAULT 0.00 | SPHERE IN LEFT EYE |
| ODCYLINDER | DECIMAL(9,2), NOT NULL | CYLINDER IN RIGHT EYE |
| OSCYLINDER | DECIMAL(9,2), NOT NULL | CYLINDER IN RIGHT EYE |
| ODAXIS | DECIMAL(9,2), NOT NULL | AXIS |
| PD | DECIMAL(9,2), NOT NULL | |
| VL3000VIEW | IMAGE, NULL | |

FIG. 10A

| CLIENTADDRESS | TABLE OF SHIPPING ADDRESSES OF THE CLIENT | |
|---|---|---|
| REFCLIENTADDRESS | INT, PK | CLIENT ADDRESS ID |
| CLIENTID | VARCHAR(255), NOT NULL FKCLIENTADDRESS_CLIENTID_REFCLIENT | CLIENT ID |
| CLIENTADDRESS | NVARCHAR(150) NOT NULL | CLIENTS ADDRESS |
| CLIENTSTATEID | SMALLINT, NULL FKCLIENTS_CLIENTSTATEID_REFSTATE | ID OF STATE |
| CLIENTCITYID | INT, NOT NULL, FKCLIENTS_CLIENTCITYID_REFCITY | ID OF CITY |
| CLIENTCITYNAME | VARCHAR(50) | NAME OF CITY (TEMPORARY) |
| CLIENTCOUNTRYID | TINYINT, NOT NULL, FKCLIENTS_CLIENTCOUNTRYID_REFCOUNTRY | ID OF COUNTRY |
| CLIENTZIPCODE | INT | ZIP CODE |
| CLIENTPHONE | VARCHAR(30) | TELEPHONE NUMBER |
| CLIENTFAX | VARCHAR(30) | FACSIMILE NUMBER |
| BILLTO | TINYINT, DEFAULT 1, CHECK IN (0,1) | IF THIS ADDRESS IS FOR BILLING |
| SHIPTO | TINYINT, DEFAULT 1, CHECK IN (0,1) | IF THIS ADDRESS IS FOR SHIPPING |

FIG. 10B

| CLIENTFACE | | | TABLE OF 3D AND 2D FACES OF EACH CLIENT |
|---|---|---|---|
| REFCLIENTFACE | TINYINT, CHECK BETWEEN 1 AND 3 | PK | FACE ID; USER CAN HAVE MAX 3 FACES; IF HE WANTS NEW FACE, HE MUST REPLACE AN OLD ONE. |
| CLIENTID | VARCHAR(255), FKCLIENTFACE_CLIENTID_REFCLIENT | | ID OF THE CLIENT, AN OWNER OF THE FACE |
| CLIENTFACE3DMTX | VARCHAR(11) | | NAME OF MTX FILE W/O FILE EXTENSION |
| PUPILRIGHT | VARCHAR(255) | | COORDINATES OF RIGHT PUPIL (X,Y,Z) ON THE CURRENT 3D FACE |
| PUPILLEFT | VARCHAR(255) | | COORDINATES OF LEFT PUPIL (X,Y,Z) ON THE CURRENT 3D FACE |
| TEMPLERIGHT | VARCHAR(255) | | COORDINATES OF RIGHT EAR (X,Y,Z) ON THE CURRENT 3D FACE |
| TEMPLELEFT | VARCHAR(255) | | COORDINATES OF LEFT EAR (X,Y,Z) ON THE CURRENT 3D FACE |
| FACECENTER | VARCHAR(255) | | COORDINATES (X,Y,Z) OF THE CENTER OF THE FACE (NOSE) |
| CLIENTDEFPOS | VARCHAR(255) | | COORDINATES THAT SPECIFY THE IDEAL POSITION OF THE FRAMES ON A GIVEN FACE |
| CLIENTDEFPOS1 | VARCHAR(255) | | COORDINATES THAT POSITION OF THE FRAMES FOR A GIVEN FACE |
| CLIENTFACEORDER | TINYINT | | FOR DEFAULT CLIENT |

FIG. 10C

| MODELFACE | | |
|---|---|---|
| REFMODELFACE | SMALLINT, PK, IDENTITY | FACE ID |
| MODELFACE3DMTX | VARCHAR(40) | NAME OF MTX FILE W/O FILE EXTENSION |
| MODELFACEFRAMESIZE | VARCHAR(11) | FRAME SIZE OF MODEL FACE |
| AGE | TINYINT | WHAT IS AN AGE OF THE MODEL FACE (USED FOR SELECTING FRAMES). |
| GENDER | | GENDER OF THE MODEL |
| MODELDEFPOS | VARCHAR(255) | COORDINATES THAT SPECIFY THE IDEAL POSITION OF THE FRAMES ON A GIVEN FACE |
| MODELDEFPOS1 | VARCHAR(255) | COORDINATES THAT POSITION OF THE FRAMES FOR A GIVEN FACE |

FIG. 10D

| CHAINMODELFACE | - TABLE THAT LINKS CHAINS AND MODEL FACES | | |
|---|---|---|---|
| CHAINID | SMALLINT, NOT NULL FKMODELFACE_CHAINID_REFCHAIN | PK | ID OF THE CHAIN THAT THE MODEL FACE BELONGS TO |
| MODELFACEID | SMALLINT, FKCHAINMODELFACE_MODELFACEID REFMODELFACE | | ID OF THE MODEL FACE |

FIG. 10E

| SHOPMODELFACE | - TABLE THAT LINKS SHOPS AND MODEL FACES | | |
|---|---|---|---|
| SHOPID | SMALLINT, NOT NULL FKMODELFACE_SHOPID _REFSHOP | PK | ID OF THE SHOP THAT THE MODEL FACE BELONGS TO |
| MODELFACEID | SMALLINT, FKSHOPMODELFACE_MOD ELFACEID _REFMODELFACE | | ID OF MODEL FACE |
| PRIORITY | TINYINT | | AN ORDER NUMBER OF APPEARANCE ON THE FIRST SCREEN FOR EACH CHAIN. |
| PRIORITY2NDLEVEL | TINYINT | | AN ORDER NUMBER OF APPEARANCE ON THE SCREEN, WHEN SOMEBODY WANTS TO SEE MORES FACES OF THE SAME TYPE. |

FIG. 10F

| FRAMEMODEL | TABLE OF ALL FRAME MODELS AND ITS FIXED PROPERTIES | |
|---|---|---|
| REFFRAMEMODEL | INT, PK, IDENTITY | ID OF FRAME MODEL IN THE SYSTEM |
| FRAMEMODELNAME | VARCHAR(50), NOT NULL | NAME OF FRAME MODEL |
| GLASSTYPEID | SMALLINT, NULL FKFRAMEMODEL_GLASSTYPEID _REFGLASSTYPE | TYPE OF GLASSES, LINK TO GLASSTYPE TABLE |
| BRANDID | SMALLINT, NULL FKFRAMEMODEL_BRANDID _REFBRAND | NAME OF BRAND OF FRAME MODEL. LINK TO BRANDS TABLE |
| DESIGNERID | SMALLINT, NULL FK_FRAMEMODEL_DESIGNER | NAME OF DESIGNER |
| MANUFACTURERID | SMALLINT, NULL FK_FRAMEMODEL_MANUFACTURER | NAME OF MANUFACTURER |
| FRAMETYPEID | SMALLINT, NULL, FKFRAMEMODEL_FRAMETYPEID _REFFRAMETYPE | TYPE OF FRAME MODEL, LINK TO FRAME TYPE TABLE |
| MATERIALID | SMALLINT, NULL FKFRAMEMODEL_MATERIALID _REFMATERIAL | MATERIAL, THE FRAME MODEL IS MADE OF; LINK TO MATERIALS TABLE |
| FRAMESHAPEID | SMALLINT, NULL FKFRAMEMODEL_FRAMESHAPEID _REFFRAMESHAPE | SHAPE OF FRAME MODEL; LINK TO FRAME SHAPE TABLE |

FIG. 10G

| CHAINFRAMEMODEL | TABLE OF FRAME MODELS AND ITS BUSINESS PROPERTIES FOR EACH CHAIN IS USED IN. | |
|---|---|---|
| FRAMEMODELID | INT, NOT NULL FKCHAINFRAMEMODEL_FRAMEMODELID _REFFRAMEMODEL | ID OF THE FRAME MODEL IN THE SYSTEM |
| CHAINMODELNUMBER | VARCHAR(10), NOT NULL | SDK OF THE FRAME MODEL IN THE CHAIN |
| CHAINID | SMALLINT, NOT NULL FKCHAINFRAMEMODEL_CHAINID _REFCHAIN | PK | ID OF THE CHAIN TO WHICH BELONGS THIS INSTANCE OF THE FRAME MODEL |
| CHAINMODELNAME | NVARCHAR(50), NOT NULL | NAME OF THE MODEL IN CHAIN |
| AGEGENDERID | TINYINT, FKCHAINFRAMEMODEL_AGEGENDERID _REFAGEGENDER | TO WHICH AGE GENDER CATEGORY THE MODEL BELONGS. |

FIG. 10H

| SHOPFRAMEMODEL | TABLE OF FRAME MODELS AND ITS BUSINESS PROPERTIES FOR EACH SHOP | |
|---|---|---|
| FRAMEMODELID | INT, NOT NULL FKCHAINFRAMEMODEL _FRAMEMODELID _REFFRAMEMODEL | ID OF THE FRAME MODEL IN THE SYSTEM |
| SHOPID | SMALLINT, NOT NULL FKSHOPFRAMEMODEL_SHOPID _REFCHAIN | PK | ID OF THE CHAIN TO WHICH BELONGS THIS INSTANCE OF THE FRAME MODEL |
| PRIORITY | INT, DEFAULT 5, CHECK BETWEEN 1 AND 10 | ORDER NUMBER OF APPEARING ON THE SCREEN. |

FIG. 11A

| FRAME | TABLE OF ALL FRAMES IN THE SYSTEM AND ITS FIXED PROPERTIES | |
|---|---|---|
| REFFRAME | INT, PK, IDENTITY | ID OF THE FRAME IN THE SYSTEM |
| FRAMEMODELID | INT, NOT NULL FKFRAME_FRAMEMODELID _REFFRAMEMODEL | ID OF THE MODEL TO WHICH THE FRAME BELONGS. |
| SIZE | VARCHAR(11) | SIZE OF THE FRAME |
| COLORCATEGORYID | TINYINT, NULL FKFRAME_COLORCATEGORYID _REFCOLORCATEGORY | TO WHICH CATEGORY BELONGS A COLOR OF THE FRAME |
| FRAME3DMTX | VARCHAR(255) | 3D IMAGE FILE NAME W/O FILE EXTENSION |
| FRAMESIZEID | TINYINT FK_FRAME_FRAMESIZE | TEXTUAL DESCRIPTION OF THE FRAME SIZE (WIDE, NARROW) |
| FRAMESTATUSID | TINYINT, NOT NULL, FKFRAME_FRAMESTATUSID _REFFRAMESTATUS | IF A FRAME IS AVAILABLE FOR APPEARING ON THE FOR SITE, 22- AVAILABLE FOR POS_ |
| CREATIONPRIORITYID | TINYINT FK_FRAME_CREATIONPRIORITY | WHAT IS A PRIORITY OF THE FRAME PRODUCTION |
| SHIPMENTID | INT FK_FRAME_SHIPMENT | ID OF SHIPMENT FOR FRAME |
| FRAMEDEFPOS | VARCHAR(255) | ARM POSITION RELATIVE TO THE WAY IT IS STORED |

FIG. 11B

| CREATIONPRIORITY | TABLE OF PRIORITIES IN CREATION OF FRAME IMAGES | |
|---|---|---|
| REFCREATIONPRIORITY | TINYINT | ID OF PRIORITY |
| CREATIONPRIORITY | VARCHAR(10) | NAME (NORMAL, URGENT) |

FIG. 11C

| FRAMESCHEDULE | LIST OF SCHEDULES FOR FRAMES | |
|---|---|---|
| FRAMEID | INT, PK FK_FRAMESCHEDULE_FRAME | ID OF FRAMES |
| DATETIME | TIMESTAMP | TIME OF INSERTING FRAME FOR SCHEDULING |
| USERID | INT FK_FRAMESCHEDULE_USER | ID OF THE USER THAT INSERTED A FRAME SCHEDULE |
| SCHEDULEDFOR | DATETIME | WHEN THE FRAME WILL BE AVAILABLE BACK |

FIG. 11D

| SHIPMENT | TABLE OF SHIPMENTS NUMBERS AND FRAMES INSIDE | |
|---|---|---|
| REFSHIPMENT | INT, PK | ID OF THE SHIPMENT |
| SHIPMENTNAME | VARCHAR (50), PK | NAME OF SHIPMENT |
| SHIPMENTDATE | DATETIME | DATE OF SHIPMENT ARRIVAL |

FIG. 11E

| CHAINFRAME | TABLE OF FRAMES AND ITS BUSINESS PROPERTIES FOR EACH CHAIN IN WHICH IT IS USED | | |
|---|---|---|---|
| CHAINSKUNUMBER | VARCHAR(8), NOT NULL | | SKU OF FRAME IN CHAIN |
| FRAMEID | INT FKCHAINFRAME_FRAMEID_REFRAME | PK | ID OF THE FRAME IN THE SYSTEM |
| CHAINID | SMALLINT FKCHAINFRAME_CHAINID_REFCHAIN | | ID OF THE CHAIN IN THE SYSTEM |
| COLORNAMEID | INT, NULL FKCHAINFRAME_COLORNAMEID_REFCOLORNAME | | ID OF COLOR OF THE FRAME |
| DEFAULTCOLOR | CHECK IN (0,1) | | DEFINES IF IT IS A PRIMARY FRAME FOR A MODEL DEMONSTRATION ON THE SCREEN |

FIG. 11F

| SHOPFRAME | TABLE OF FRAMES AND ITS BUSINESS PROPERTIES FOR EACH SHOP IN THE CHAIN | | |
|---|---|---|---|
| FRAMEID | INT, FKSHOPFRAME_FRAMEID _REFRAME | PK | ID OF THE FRAME IN THE SYSTEM |
| SHOPID | INT, FKSHOPFRAME_SHOPID _REFSHOP | | ID OF THE SHOP IN THE SYSTEM |
| SHOPFRAMEAVAILABLE | SMALLINT, NOT NULL | | HOW MANY SAMPLES OF THE FRAME ARE IN THE<br><br>NOT BE SHOWN ON THE SITE OF THE SHOP |
| SUSPENDED | TINYINT, CHECK IN (0,1), DEFAULT 0, NOT NULL | | PREVENTING OF APPEARING OF THE FRAME ON THE SITE OF THE SHOP. |
| PRICE | DECIMAL(9,2) | | PRICE OF THE FRAME IN THE SHOP |
| DISCOUNTPERCSHOP | DECIMAL (3,2) DEFAULT 0.00, CHECK (DISCOUNTPERCSHOP>=0.00 AND DISCOUNTPERCSHOP<1.00 AND (DISCOUNTPERCSHOP+DISCOUNTPERCINTERNET <1.00)) | | DISCOUNT IN % FOR THE FRAME IN THE SHOP |
| DISCOUNTPERCINTERNET | DECIMAL (3,2), DEFAULT 0.00 CHECK (DISCOUNTPERCINTERNET> =0.00 AND DISCOUNTPERCINTERNET<1 .00 AND (DISCOUNTPERCSHOP+DISCOUNTPERCINTERNET <1.00)) | | DISCOUNT IN % FOR THE FRAME ON THE SITE |
| ADVERTISMENT | VARCHAR(255) | | TEXT OF THE ADVERTISEMENT |

FIG. 11G

| SHOPFRAME | TABLE OF FRAMES AND ITS BUSINESS PROPERTIES FOR EACH SHOP IN THE CHAIN | |
|---|---|---|
| STATUSICONID | SMALLINT, FK_SHOPFRAME_STATUSICON | ID OF THE STATUS ICON THAT IS ATTACHED TO THE DETAILS ARE DISPLAYED OR FOR SELECTIONS AND SO ON |
| DEALID | INT, NULL FK_SHOPFRAME_DEAL | ID OF THE DEAL, THE FRAME BELONGS TO. DEALS ARE DEFINED BY SHOP |

FIG. 11H

| STATUSICON | TABLE OF STATUS ICONS THAT ARE ATTACHED TO SHOP FRAMES (TOP TEN, NEW, ETC.) | |
|---|---|---|
| REFSTATUSICON | SMALLINT | ID OF STATUS ICON |
| CHAINID | SMALLINT FK_STATUSICON_CHAIN | ID OF CHAIN |
| STATUSICONNAME | VARCHAR(50) | NAME OF THE STATUS |

FIG. 12A

| DEAL | TABLE OF DEALS THAT A SHOP CAN DEFINE ON IMAGE WILL BE STORED IN THE IMAGES TABLE | |
|---|---|---|
| REFDEAL | INT, PK | ID OF THE DEAL |
| CHAINID | SMALLINT FK_DEAL_CHAIN | ID OF THE CHAIN THAT CREATED DEAL |
| DEALNAME | VARCHAR(50) | NAME OF THE DEAL |
| DEALFORMULA | TEXT | FORMLULA OF CALCULATING THE PRICE FOR THE DEAL |

FIG. 12B

| FRAMEGROUP | | |
|---|---|---|
| REFGROUP | INT, PK, IDENTITY | ID OF GROUP |
| SHOPID | INT, NOT NULL FKFRAMEGROUP_SHOPID _REFSHOP | ID OF SHOP |
| FRAMEGROUPNAME | NVARCHAR(20) | NAME OF GROUP |
| LEADFRAMEID | INT, NOT NULL FKFRAMEGROUP_FRAMEID _REFFRAME | ID OF FRAME THAT WILL APPEAR ON THE SCREEN AS KEY OF THE GROUP |
| SUSPENDED | TINYINT, DEFAULT=0, CHECK IN (0,1) | IF IT IS EQUAL 1, WILL NOT APPEAR ON THE SITE OF THE SHOP |

FIG. 12C

| FRAMESTOGROUP | LINK TABLE BETWEEN FRAME GROUPS AND FRAMES (WHAT GROUP CONTAINS WHICH FRAMES) | |
|---|---|---|
| FRAMEGROUPID | INT FKFRAMESTOGROUP _GROUPID_REFGROUP | ID OF FRAME |
| FRAMEID | INT FKFRAMESTOGROUP _FRAMEID_REFFRAME | ID OF GROUP |

FIG. 12D

| BRAND | TABLE OF BRANDS | |
|---|---|---|
| REFBRAND | SMALLINT, PK, IDENTITY | ID OF BRAND |
| BRANDNAME | VARCHAR(50) | BRAND NAME |

FIG. 12E

| COUNTRY | TABLE OF COUNTRIES | |
|---|---|---|
| REFCOUNTRY | TINYINT, PK, IDENTITY | ID OF COUNTRY |
| COUNTRYABBREVIATION | VARCHAR(5) | ABBREVIATION OF COUNTRY NAME |
| COUNTRYNAME | VARCHAR(100), NOT NULL | COUNTRY FULL NAME (ENG) |

FIG. 12F

| STATE | TABLE OF STATES BY COUNTRIES | |
|---|---|---|
| REFSTATE | SMALLINT, PK, IDENTITY | ID OF STATE |
| COUNTRYID | TINYINT, NOT NULL FKSTATES_COUNTRYID_REFCOUNTRY | ID OF COUNTRY WHERE STATE IS LOCATED |
| STATEABBREVIATION | VARCHAR(5) | ABBREVIATION OF STATE NAME |
| STATENAME | VARCHAR(50), NOT NULL | STATE NAME ON ENGLISH |

FIG. 12G

| CITY | TABLE OF CITIES BY STATE AND BY COUNTRY | |
|---|---|---|
| REFCITY | INT, PK, IDENTITY | ID OF CITY |
| CITYNAME | VARCHAR(100) | NAME OF CITY |
| COUNTRYID | TINYINT, NOT NULL, FKCITIES_CITYID_REFCITY | ID OF COUNTRY THE CITY IS LOCATED IN |
| STATEID | SMALLINT, NULL FKCITIES_STATEID_REFSTATE | ID OF THE STATE THE CITY IS LOCATED IN |

FIG. 12H

| ACTIVITYTYPE | TABLE OF ACTIVITIES, TO WHICH BELONG FRAMES (SPORT, ETC.) | |
|---|---|---|
| REFACTIVITYTYPE | TINYINT, PK, IDENTITY | ID OF ACTIVITY TYPE |
| ACTIVITYTYPE | VARCHAR(30) | NAME OF ACTIVITY |

FIG. 13A

| COLORCATEGORY | TABLE OF COLOR CATEGORIES | |
|---|---|---|
| REFCOLORCATEGORY | TINYINT, PK, IDENTITY | ID OF COLOR CATEGORY |
| COLORCATEGORY | VARCHAR(30) | NAME OF COLOR CATEGORY |

FIG. 13B

| COLORNAME | TABLE OF ALL COLOR NAMES OF FRAMES FOR ALL CHAINS | |
|---|---|---|
| REFCOLORNAME | TINYINT, PK, IDENTITY | ID OF COLOR |
| COLORNAME | VARCHAR(30) | COLOR NAME |

FIG. 13C

| COLORTYPE | TABLE OF ALL COLOR TYPES OF LENSES | |
|---|---|---|
| REFCOLORTYPE | INT, PK, IDENTITY | ID OF COLOR TYPE |
| COLORTYPE | VARCHAR(12) | COLOR TYPE NAME |

FIG. 13D

| FACESHAPE | TABLE OF FACE SHAPES | |
|---|---|---|
| REFFACESHAPE | TINYINT, PK, IDENTITY | ID OF FACE SHAPE |
| FACESHAPE | VARCHAR(30) | NAME OF FACE SHAPE |

FIG. 13E

| FRAMESHAPE | TABLE OF POSSIBLE FRAME SHAPES (ROUND, SQUARE, AVIATOR) | |
|---|---|---|
| REFFRAMESHAPE | TINYINT, PK, IDENTITY | ID OF FRAME SHAPE |
| FRAMESHAPE | VARCHAR(30) | FRAME SHAPE NAME |

FIG. 13F

| FRAMESIZE | TEXTUAL DESCRIPTION OF FRAME SIZE (WIDE, NARROW) | |
|---|---|---|
| REFFRAMESIZE | TINYINT, PK, IDENTITY | ID OF FRAME SIZE |
| FRAMESIZE | VARCHAR(20) | FRAME SIZE NAME |

FIG. 13G

| FRAMESTATUS | TABLE OF STATUS OF FRAMES ACCORDING TO THE PROCESS OF CREATING 3D IMAGES | |
|---|---|---|
| REFFRAMESTATUS | TINYINT, PK, IDENTITY | ID OF STATUS |
| FRAMESTATUS | VARCHAR(30) | STATUS NAME |

FIG. 13H

| FRAMETYPE | TABLE OF FRAME TYPES (FULL, HALF, FRAMELESS) | |
|---|---|---|
| REFFRAMETYPE | TINYINT, PK, IDENTITY | ID OF FRAME TYPE |
| FRAMETYPE | VARCHAR(30) | NAME OF FRAME TYPE |

FIG. 14A

| GLASSTYPE | TABLE OF GLASS TYPES OF FRAME MODELS (EYEGLASSES, PRESCRIPTION) | |
|---|---|---|
| REFGLASSTYPE | TINYINT, PK, IDENTITY | ID OF GLASS TYPE |
| GLASSTYPE | VARCHAR(30) | NAME OF GLASS TYPE |

FIG. 14B

| MATERIAL | TABLE OF MATERIAL OF THEM FRAME IS MADE | |
|---|---|---|
| REFMATERIAL | TINYINT, PK, IDENTITY | ID OF MATERIAL; |
| MATERIAL | VARCHAR(50) | NAME OF MATERIAL |

FIG. 14C

| SKINCOLOR | TABLE OF SKIN COLORS | |
|---|---|---|
| REFSKINCOLOR | TINYINT, PK | ID OF SKIN COLORS |
| SKINCOLOR | VARCHAR(30) | NAME OF SKIN COLORS |

FIG. 14D

| CHOICEOPTION | TABLE OF TYPES OF CONTROL (COMBO, | |
|---|---|---|
| REFCHOICEOPTION | TINYINT, IDENTITY, PK | ID OF CONTROL |
| CHOICEOPTIONNAME | VARCHAR(10) | NAME OF CONTROL |

FIG. 14E

| SHOPSTATUS | TABLE OF SHOP STATUSES | |
|---|---|---|
| REFSHOPSTATUS | TINYINT, PK | ID OF SHOP STATUS |
| SHOPSTATUS | VARCHAR(20) | NAME OF STATUS |

FIG. 14F

| DESIGNER | TABLE OF DESIGNERS | |
|---|---|---|
| REFDESIGNER | SMALLINT, PK | ID OF DESIGNER |
| DESIGNER | VARCHAR(50) | NAME OF DESIGNER |

FIG. 14G

| MANUFACTURER | TABLE OF FRAMES MANUFACTURERS | |
|---|---|---|
| REFMANUFACTURER | SMALLINT, PK | ID OF MANUFACTURER |
| MANUFACTURER | VARCHAR(50) | NAME OF MANUFACTURER |

FIG. 14H

| ALERT | ENGLISH AND TRANSLATION WILL BE IN TRANSLATION TABLE) | |
|---|---|---|
| REFALERT | SMALLINT, PK | ID OF ALERT |
| ALERT | TEXT | TEXT OF THE ALERT |

FIG. 15A

| CHAINTOGLASSTYPE | LINK TABLE BETWEEN GLASS TYPE AND CHAIN(WHAT KINDS OF GLASSES, THE CHAIN IS SELLING) | |
|---|---|---|
| CHAINID | SMALLINT, FK_CHAINTOGLASSTYPE_CHAIN | ID OF CHAIN |
| GLASSTYPEID | TINYINT FKGLASSTYPETOACTIVITY _GLASSTYPEID_REFGLASS TYPE | ID OF GLASS TYPE |
| PRIORITY | TINYINT | IN WHICH ORDER WILL APPEAR GLASS TYPE ICONS ON THE SCREEN ACCORDING TO CHAIN |

FIG. 15B

| GLASSTYPETOACTIVITY | LINK TABLE BETWEEN GLASS TYPE AND ACTIVITY | |
|---|---|---|
| ACTIVITYTYPEID | TINYINT FKGLASSTYPETOACTIVITY _ACTIVITYID _REFACTIVITY | ID OF ACTIVITY TYPE |
| GLASSTYPEID | TINYINT FKGLASSTYPETOACTIVITY _GLASSTYPEID_REFGLASS TYPE | ID OF GLASS TYPE |

FIG. 15C

| FRAMEMODELTOACTIVITY | TABLE- LINK BETWEEN CHAIN FRAME MODEL AND ACTIVITY | |
|---|---|---|
| FRAMEMODELID | INT, NOT NULL FKFRAMEMODELTOACTIVITY _FRAMEMODELID_REFFRA MEMODEL | ID OF FRAME MODEL |
| CHAINID | SMALLINT | ID OF THE CHAIN |
| ACTIVITYTYPEID | TINYINT, NOT NULL FKFRAMEMODELTOACTIVITY _ACTIVITYTYPEID_REFACT IVITYID | ID OF ACTIVITY TYPE |

FIG. 15D

| FRAMEMODELTOFACES HAPE | TABLE- LINK BETWEEN FRAME MODEL AND FACE SHAPE | |
|---|---|---|
| FRAMEMODELID | INT, NOT NULL FKFMODELTOFACESHAPE _FRAMEMODELID_REFFRAME MODLE | ID OF FRAME MODEL |
| FACESHAPEID | TINYINT, NOT NULL FKFMODELTOFACESHAPE_FAC ESHAPEID _REFFACESHAPE | ID OF FACE SHAPE |

FIG. 15E

| FRAMETOSKINCOLOR | TABLE LINK BETWEEN FRAME AND SKIN COLOR | |
|---|---|---|
| FRAMEID | INT, NOT NULL FKFRAMETOSKINCOLOR_ FRAMEID_REFFRAME | ID OF FRAME |
| SKINCOLORID | TINYINT, NOT NULL FKFRAMETOSKINCOLOR_ SKINCOLORID_REFSKINCOLOR | ID OF SKIN COLOR |

FIG. 15F

| LENSTINTCOLOR | TABLE OF DEFINITIONS OF POSSIBLE TINT, COLOR AND OPACITY OF LENSES | |
|---|---|---|
| REFLENSTINTCOLOR | TINYINT, PK, IDENTITY | ID OF TINT COLOR CATEGORY |
| COLOR | CHAR(6) | HEXADECIMAL NAME OF COLOR |
| APICOLOR | VARCHAR(20) | RGB TINT COLOR WITH OPACITY IN % OF 255 |
| APICOLORBASIC | VARCHAR(20) | RGB BASIC TINT COLOR IN % OF 255 |
| OPACITYPERC | DECIMAL(4,3) | LENS OPACITY IN % |
| COLORTYPEID | TINYINT FK_COLORTYPE_LENSTINTCOLOR | ID OF LENSTINT COLOR TYPE |
| COLORORDER | TINYINT | ORDER NUMBER OF THE TINT COLOR ON THE SCREEN |

FIG. 15G

| LENSPARAMS | TABLE, LISTING ALL THE PARAMETERS, CHARACTERISTIC TO LENSES, AS COATINGS, THICKNESS, ETC. | |
|---|---|---|
| REFLENSPARAM | TINYINT, PK | ID OF LENS PARAMETER |
| LENSPARAMNAME | VARCHAR(20) | LENS PARAMETER NAME |
| LENSHTMLHEADER | VARCHAR(255) | HEADER THAT WILL BE PRESENTED ON THE SITE |
| CHOICEOPTIONID | TINYINT FKLENSPARAM_CHOICEOPTIONID _REFCHOICEOPTION | ID OF THE TYPE OF CONTROL |

FIG. 15H

| LENSPARAMVALUES | TABLE OF PARAMETERS VALUES | |
|---|---|---|
| REFLENSPARAMVALUE | TINYINT, IDENTITY, PK | ID OF VALUE OF LENS PARAMETERS |
| LENSPARAMID | TINYINT, FKLENSPARAMVALUE_LENSPARAMID_REFLENSPARAM | ID OF LENS PARAMETERS |
| LENSPARAMVALUE | VARCHAR(25) | VALUE OF PARAMETER |
| LENSFREETEXT | TINYINT, DEFAULT 0, CHECK IN (0,1) | IF TO ADD TEXTBOX NEAR CONTROL FOR FREE TEXT INPUT |

FIG. 16A

| SHOPPINGCART | TABLE OF SHOPPING CARTS OF EACH CLIENT | |
|---|---|---|
| REFSHOPPINGCART | INT, PK, IDENTITY | ID OF SHOPPING CART OPENED FOR A CUSTOMER |
| CLIENTID | INT FKSHOPPINGCART_CLIENTID REFCLIENTID | ID OF CLIENT |

FIG. 16B

| SHOPPINGCARTDETAIL | TABLE OF ITEMS AND ITS PROPERTIES THAT A | | |
|---|---|---|---|
| SHOPPINGCARTID | INT FKSHOPPINGCARTD ETAILS_ SHOPPINGCARTID_ REFSHOPPINGCART | PK | ID OF SHOPPING CART |
| REFLINE | INT, IDENTITY | | ID OF THE LINE IN THE SHOPPING CART |
| FRAMEID | INT FKSHOPPINGCARTDETAIL S_ FRAMEID_REFFRAMEID | | ID OF FRAME SELECTED |
| QUANTITY | TINYINT, NOT NULL, DEFAULT 1 | | QUANTITY |
| LENSTINTCOLORID | TINYINT, FK_SHOPPINGCARTDETAI LS_ LENSTINTCOLOR | | ID OF TINT COLOR OF LENSES |
| SHOPPINGPRICE | DECIMAL(9,2) | | PRICE FOR CLIENT THAT INCLUDES SHOP AND INTERNET DISCOUNT |
| SHOPPINGDATE | DATETIME, NOT NULL | | FRAME IN SHOPPING CART OF A CUSTOMER |

FIG. 16C

| SHOPPINGCARTVALUE | TABLE OF LENS PARAMETERS VALUE FOR CLIENT SHOPPING | | |
|---|---|---|---|
| SHOPPINGCARTID | INT, FKSHOPPINGCARTVALUE_SHOPPINGCART | | ID OF CLIENT |
| LINEID | INT | PK | ID OF THE LINE IN THE SHOPPING CART |
| LENSVALUEID | TINYINT, FKSHOPPINGCARTVALUE_LENSPARAMVALUE | | ID OF THE VALUE OF LENS PARAMETERS |
| LENSFREETEXT | NVARCHAR(255) | | TEXT WRITTEN IN TEXTBOX NEAR OPTION |

FIG. 16D

| ORDER | TABLE OF ORDERS OF EACH CLIENT (AFTER CLIENT CONFIRMED THAT HE WANTS TO ORDER). DATA MOVES FROM SHOPPING CART TO ORDERS | |
|---|---|---|
| REFORDER | INT, IDENTITY, PK | ID OF ORDERS |
| CLIENTID | INT FKORDERS_CLIENTID_REFCLIENT | ID OF CLIENTS |
| ORDERDATE | DATETIME | DATE OF ORDER |
| CLIENTADDRESSID | INT FKORDERS_CLIENTADDRESSID_REFCLIENTADDRESS | ID OF SHIPPING ADDRESS |

FIG. 16E

| ORDERDETAIL | DETAILS OF THE ORDER | | |
|---|---|---|---|
| ORDERID | INT, NOT NULL FKORDERDETAILS_ORDERID_REFORDER | PK | ID OF THE ORDER |
| REFLINE | SMALLINT, NOT NULL | | NUMBER OF LINE IN THE ORDER |
| FRAMEID | INT, NOT NULL FKORDERDETAILS_FRAMEID_REFRAME | | ID OF FRAME |
| QUANTITY | TINYINT, NOT NULL DEFAULT=1 | | QUANTITY |
| LENSCOLORID | TINYINT | | ID OF LENS TINT COLOR |
| ORDERPRICE | DECIMAL(9,2) | | PRICE |

FIG. 16F

| ORDERVALUE | TABLE OF LENS PARAMETERS VALUES FOR EACH FRAME ORDERED BY CLIENT | | |
|---|---|---|---|
| ORDERID | INT, FKORDERVALUES_ORDERID_REFORDER | PK | ID OF ORDER |
| LINEID | SMALLINT, FKORDERVALUES_LINEID_REFLINE | | ID OF LINE IN THE ORDER |
| LENSVALUEID | TINYINT FKSHOPPINGCARTVALUE_LENSVALUEID_REFLENSPARAMVALUE | | ID OF SELECTED LENS PARAMETER VALUE |
| LENSFREETEXT | NVARCHAR(255) | | TEXT WRITTEN IN TEXTBOX NEAR OPTION |

FIG. 16G

| SCREENFIELD | LIST OF SCREENS AND FIELDS IN ADMIN UTILITY | |
|---|---|---|
| REFSCREENFIELD | SMALLINT, IDENTITY, PK | ID OF SCREEN-FIELD |
| SCREENNAME | VARCHAR(30) | SCREEN NAME |
| FIELDNAME | VARCHAR(30) | FIELDNAME |

FIG. 16H

| PROFILE | LIST OF DEFAULT PROFILES FOR EACH CHAIN (CHAIN MANGER, SHOP MANAGER) | |
|---|---|---|
| REFPROFILE | SMALLINT, IDENTITY, PK | ID OF PROFILE |
| CHAINID | SMALLINT, NULL FK_PROFILE_CHAIN | ID OF THE CHAIN. ID THERE IS NO CHAIN, THE PROFILE BELONGS TO IVIEW |
| PROFILENAME | VARCHAR(30) | NAME OF THE PROFILE |

FIG. 17A

| PROFILETOSCREENFIELD | WHAT ACTIONS ARE PERMITTED FOR EACH PROFILE FOR EACH SCREEN FIELD (IF DOES NOT HAVE ANY PERMISSIONS ON IT) | | |
|---|---|---|---|
| PROFILEID | SMALLINT, PK FK_PROFILETOSCREENFIELD_ PROFILE | PK | ID OF THE PROFILE |
| SCREENFIELDID | SMALLINT, FK_PROFILETOSCREENFIELD_ SCREENFIELD | | ID OF THE SCREEN_FIELD |
| VISIBLE | TINYINT, DEFAULT 0, CHECK IN (0,1) | | IF THE FIELD IS VISIBLE |
| LOCKED | TINYINT, DEFAULT 0, CHECK IN (0,1) | | IF THIS FIELD IS LOCKED FOR ACTION |

FIG. 17B

| USER | TABLE OF USERS OF ALL CHAINS | |
|---|---|---|
| REFUSER | INT, IDENTITY, PK | ID OF USER OF ADMIN UTIL |
| CHAINID | SMALLINT, NULL, FK_USER_CHAIN | ID OF THE CHAIN, NULL IF THE USER BELONGS TO IVIEW |
| NAME | VARCHAR(10), UNIQUE | USER NAME |
| PASSWORD | VARCHAR(10) | PASSWORD |
| SHOPID | INT, NULL FK_USER_SHOP | ID OF THE SHOP, THE USER BELONGS TO. CAN BE NULL IF THE USER IS IN CHAIN ONLY OR IVIEW |
| PROFILEID | SMALLINT, NOT NULL FK_USER_PROFILE | ID OF THE PROFILE, THE USER BELONGS TO |
| USERTYPEID | TINYINT, NOT NULL FK_USER_USERTYPE | ID OF THE USERTYPE (IVIEW, CHAIN, ADMIN) |

FIG. 17C

| USERTYPE | TABLE OF TYPE OF USERS (CHAIN LEVEL, SHOP LEVEL, IVIEW LEVEL) | |
|---|---|---|
| REFUSERTYPE | TINYINT, PK, IDENTITY | ID OF USER TYPE |
| USERTYPE | VARCHAR(10) | USER TYPE NAME |

FIG. 17D

| USERDENYRIGHT | TABLE OF USERS AND THE RIGHTS THAT ARE DENIED FROM THEM (AGAINST WHAT WAS DETERMINED BY PROFILE) | | |
|---|---|---|---|
| USERID | INT, PK, FK_USERDENYRIGHT_USER | PK | ID OF THE USER |
| SCREENFIELDID | SMALLINT FK_USERDENYRIGHT_SCREENFIELD | | ID OF SCREEN FIELD |
| VISIBLE | TINYINT, DEFAULT 0, CHECK IN (0,1) | | IF THE FIELD IS VISIBLE |
| LOCKED | TINYINT, DEFAULT 0, CHECK IN (0,1) | | IF THIS FIELD IS LOCKED FOR ACTION |

SPECTACLES FITTING SYSTEM AND FITTING METHODS USEFUL THEREIN

This application claims the benefit of Provisional Application No. 60/205,210, filed May 18, 2000.

Computer program listing appendices are submitted herewith on one compact disc and one duplicate compact disc. The total number of compact discs including duplicates is two. The files on the compact disc are text files in hexadecimal format. Their names, dates of creation, directory locations, and sizes in bytes are:

1. Directory method containing file 42434cdr.hex of May 15, 2001 and of 213,336,448 length bytes.

The material on the compact discs is incorporated by reference herein.

FIELD OF THE INVENTION

The present invention relates to apparatus and methods for computerized fitting of spectacles.

BACKGROUND OF THE INVENTION

U.S. Pat. No. 5,592,248 to Norton describes a computerized spectacles fitting method in which digital images are taken of a subject's head. The system stores images with frame an lens fitting information which are then used to make spectacles. In Norton, a digital camera takes pictures of the subject's face e.g. wearing the glasses frame, from the left and right sides. The digital camera is electronically connected to a computer. The pictures are sent by modem to another computer at the optician's office. The images received at the opticians are viewed with a scaling and measuring program. The measurements are used to make the glasses and the scaled pictures are saved to be recalled for reference. The method of Norton is intended to be useful for custom fitting of lens to frame and frame to wearer to make and adjust glasses.

Published PCT Application No. WO 9729441 to Bechara describes a method for automating the commercial activity of an optical shop including use of an imaging apparatus to pick up the face of the customer. According to customer preference and features of the image of the face, an operating program presents suggestion of best fit eyewear products e.g. spectacles and frames. From a displayed showcase, the customer tries on and compares eyewear products on the image of the face. Once an eyewear product is selected, a computer unit connected to an assembling machine through a communications program, provides immediate assembling and delivery of the selected eyewear products. This process may be carried out from a home computer.

The disclosures of all publications mentioned in the specification and of the publications cited therein are hereby incorporated by reference.

SUMMARY OF THE INVENTION

The present invention seeks to provide an improved spectacles fitting system.

Preferably, a 3D spectacles fitting system is provided which includes a realistic virtual try-on process providing a wide view of the frames as actually fitted onto the customer's face. The customer's virtual face can typically be rotated and zoomed and viewed from any angle. The entire frame can be viewed on the face, including the side and templates. A realistic interactive frame library is typically provided which allows customers to control the viewing angle of the frame including rotating and zooming of the frames such that the customer's experience is similar to that of a customer physically holding frames in his hand. The system's display preferably takes into account lens characteristics such as but not limited to the thickness, coating and tint of the lenses. Preferably, automatic biometric measurements of customer characteristics, such as pupillary distance, is provided.

Preferably, the 3D spectacles fitting system of the present invention is operative to provide improved vision quality and aesthetics by computer evaluation of an improved or optimal fit between the customer's face, the selected frame, and the manufacture, cutting and mounting of a selected lens. Poor fitting of the frame and/or lens to a customer's face may cause poor vision and/or an accommodation period which may be both lengthy and uncomfortable for the customer thereby decreasing customer satisfaction.

Preferably, the 3D spectacles fitting system is operative to allow customers to order spectacles over the Internet while simultaneously providing improved visional quality and aesthetics as described above, Optionally, at least some fit parameters computed for spectacles ordered by an individual, typically fit parameters which are not frame-dependent, are archived in order to facilitate the fitting process the next time the same individual orders spectacles, even if he orders a different frame.

Preferably, prescription information is entered either manually or digitally or is measured from a previously owned pair of spectacles, if the prescription has not changed since then.

Preferably, an initial facial imaging process is carried out at a point of sale and subsequently, a spectacles try-on session may be carried out over the net. Alternatively, the spectacles try-one session may be carried out using the face of a model. In the latter embodiment, the system includes a model database storing 3D representations of a plurality of human models.

There is thus provided, in accordance with a preferred embodiment of the present invention, a spectacles fitting system including a wide-view imaging system operative to provide a wide-view of a client's face, a 3D image processor operative to generate first 3D information describing the client's physical features, a virtual try-on unit operative to receive a digital 3D representation of the client's face and a digital 3D representation of a spectacle frame, to virtually mount the spectacle frame onto the client's face and to generate second 3D information describing frame/facial fit, and a lens fitter operative to receive the first 3D information and the second 3D information and to generate therefrom at least one parameter for face-and-frame customized manufacture and cutting of the lens.

Further in accordance with a preferred embodiment of the present invention, the 3D information describing the client's face includes a 3D representation of the client's face.

Still further in accordance with a preferred embodiment of the present invention, the 3D information describing the client's face includes at least one quantification of at least one biometric facial feature.

Also provided, in accordance with another preferred embodiment of the present invention, is a spectacles fitting system including an imaging system operative to provide a 3D view of a clients head and face, a 3D image processor operative to generate 3D information describing the client's face, and a face/frame/lens fitting unit operative to receive 3D face information including at least one of the 3D view and the 3D information, and frame mapping information for building an image of different models of spectacles frames, the face/frame/lens fitting unit including a computerized 3D positioning unit positioning a spectacle frame model from among the models of spectacles frames onto the client's face including simulation of at least one lens parameter characterizing a lens virtually mounted within the frame.

Further in accordance with a preferred embodiment of the present invention, the system also includes a binocular representation generator operative to generate a binocular representation of a lens for the spectacle frame and the client's face.

Still further in accordance with a preferred embodiment of the present invention, the lens parameter includes the optical center of the lens.

Further in accordance with a preferred embodiment of the present invention, the first 3D information describing the client's physical features includes 3D information describing the client's face.

Still further in accordance with a preferred embodiment of the present invention, the first 3D information describing the client's physical features includes vertex distance information.

Additionally in accordance with a preferred embodiment of the present invention, the second 3D information describing frame/facial fit includes an indication of the spatial orientation of at least a portion of the frame when mounted on the client's face.

Still further in accordance with a preferred embodiment of the present invention, the indication of the frame's spatial orientation includes an indication of the frame's tilt from the horizontal.

Further in accordance with a preferred embodiment of the present invention, the indication of the frame's spatial orientation includes an indication of the arm's tilt vis a vis the frame's optical axis.

Additionally in accordance with a preferred embodiment of the present invention, the at least one parameter for manufacture and cutting of the lens includes at least one decentration parameter which depends at least partly on the second 3D information describing frame/facial fit.

Also provided, in accordance with another preferred embodiment of the present invention, is a spectacles fitting method including providing a wide-view of a client's face, generating first 3D information describing the client's physical features, receiving a digital 3D representation of the client's face and a digital 3D representation of a spectacle frame, virtually mounting the spectacle frame onto the client's face and generating second 3D information describing frame/facial fit, and receiving the first 3D information and the second 3D information and generating therefrom at least one parameter for face-and-frame customized manufacture and cutting of the lens.

Also provided, in accordance with still another preferred embodiment of the present invention, is a spectacles fitting method including providing a 3D view of a client's head and face, generating 3D information describing the client's face, receiving 3D face information including at least one of the 3D view and the 3D information, and frame mapping information for building an image of different models of spectacles frames, and positioning a spectacle frame model from among the models of spectacles frames onto the client's face including simulation of at least one lens parameter characterizing a lens virtually mounted within the frame.

Further provided, in accordance with still another preferred embodiment of the present invention, is a computerized spectacles fitting system including a computerized display of a multiplicity of spectacle options at least some of which are displayed in association with a display of views of the world as will be seen by the customer through a plurality of different lenses.

Further in accordance with a preferred embodiment of the present invention, the plurality of different lenses differ with respect to at least one of the following group of lens characteristics: tint, photochromaticity for weather adaptability, bifocal vs. progressive, antiscratch, antireflection.

Still further in accordance with a preferred embodiment of the present invention, spectacles options between which a customer is deliberating are displayed simultaneously, each associated with a view of the world which would be produce by the customer's wearing those spectacles.

Also provided, in accordance with another preferred embodiment of the present invention, is a computerized spectacles fitting system including a spectacles cost computation unit operative to compute the cost of customer-selected spectacles, and a computerized display of at least one customer-selected spectacle simultaneously with an indication of the cost thereof.

Further in accordance with a preferred embodiment of the present invention, the spectacles cost computer takes into account at least one of frames, lens and accessories, deals, special offers.

Still further in accordance with a preferred embodiment of the present invention, the spectacles cost computer performs real time computation.

Additionally in accordance with a preferred embodiment of the present invention, the spectacles cost computer performs a look-up operation in a cost table.

Still further in accordance with a preferred embodiment of the present invention, the computerized display includes a plurality of spectacled images each appearing adjacent to a displayed indication of the price of the spectacles in the image.

Also provided, in accordance with another preferred embodiment of the present invention, is an electronic spectacles purchasing system including a spectacles display unit operative to store a first plurality of 3D representations of faces and a second plurality of 3D representations of spectacles including frames and to display a 3D image of a selected one of the faces and spectacles to a user; and a frame preselection unit operative to derive face morphology information regarding an individual customer's face from the first plurality of 3D representations of faces and to select a subset of the frames to display to the individual customer, characterized in that the subset of frames are appropriate for the customer's face morphology.

Further in accordance with another preferred embodiment of the present invention, the frame preselection unit also preselects frames based on at least one of the following: customer gender, customer age, customer-imposed cost limitations, customer's manufacturer preference.

Still further in accordance with another preferred embodiment of the present invention, the at least one biometric facial feature includes at least one of the following features: temple distance; nosebridge location; and pupil distance.

Also provided, in accordance with another preferred embodiment of the present invention, is a system for measuring the pupil distance of a subject, from a distance substantially closer than optical infinity, including a camera system for measuring the pupil distance, an object disposed significantly closer to the subject than optical infinity; and a negative lens located between the subject and the object, such that the virtual image of the object appears to be effectively at optical infinity.

Preferably, the object is less than 1 meter from the object and may be less than 0.75 meter from the object or less than 0.5 meter from the object.

Preferably, the object is located in the region of the camera system.

Further in accordance with a preferred embodiment of the present invention, the object includes an illuminated LED.

BRIEF DESCRIPTION OF THE DRAWINGS AND APPENDICES

The present invention will be understood and appreciated from the following detailed description, taken in conjunction with the drawings in which:

FIGS. 8A–17D are diagram illustrations of tables which together form a database serving the system of FIG. 1.

A CD-ROM appendix is submitted herewith.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention seeks to provide an improved spectacles fitting system which preferably provides 3D imaging of faces, frames and lenses and virtual try on for eyewear, in retail and online situations.

A 3D digital imaging camera is preferably disposed at a point of sale, e.g. a retail location. The 3D camera system captures 3D images and biometric measurements of a customer that can be rotated for a wide view from every angle. Each customer typically receives a PIN code to ensure his or her privacy and control.

The output of the 3D digital imaging camera is provided to an 3D virtual try-on station which typically is also located at the point of sale. A computer screen interface typically displays the customer's face in three dimensions and virtually fits eyewear to the customer's face. The customer can select frames from a 3D virtual frame and lens inventory which is typically defined by the system user e.g. optician. The customer "feels" the texture and details of the frame as well as various lens options typically via a high resolution, realistic screen display. On return trips to the point of sale, the customer can use his or her existing personal PIN code to select and try-on additional frames.

Alternatively, the output of the 3D digital imaging camera is provided to an online try-on unit typically associated with an optician's website. Customers access their faces online, select frames and lenses and observe the results of a virtual try-on process in which the selected frames and lenses are superimposed onto their virtual faces. Typically, the website advises customers remotely and client contact is retained over time in order to reduce the 2.5 year purchase cycle. Preferably, customers' friends and family can also view their selections. Privacy is ensured e.g. by each customer's PIN code.

Preferably, the system shown and described herein provides three-dimensional virtual try-on of eyewear in which a display is generated which comprises a view of the customer's face with frames and lenses superimposed so as to illustrate how the lenses may look mounted inside the frames which are on the customer's face. Preferably, the display incorporates characteristics such as lens thickness, anti-reflection, anti-scratch, and tinting options.

Figure 1:
FIG. 1 is a simplified functional block diagram illustration of a spectacle virtual fitting system constructed and operative in accordance with a preferred embodiment of the present invention.

FIG. 1 is a simplified functional block diagram illustration of a spectacle virtual fitting system constructed and operative in accordance with a preferred embodiment of the present invention. As shown, a multi-camera electrooptical imaging system 20, shown and described below in detail, generates a 3D model of a human face 10 of a customer, imaged thereby.

In the specification, the term "customer" is used to refer to an individual who wishes to purchase spectacles and the term "point of sale" is used to refer to an optician's office or similar user who provides spectacles to the customer.

The output of the imaging system 20 typically comprises three pairs of digital image files e g, six (x,y,r,g,b) files respectively representing 3 stereoscopic views of the customer's face. The output also typically comprises alignment information, obtained by calibration of the three pairs of cameras in the imaging system and described in detail herein with reference to FIG. 2.

The outputs of imaging system 20 are typically provided to a 3D face modeller and feature extractor 60. There exist off-the-shelf units which perform the functionalities of both units 20 and 60, such as the 3D Face system marketed by Inspeck Inc. (www.inspec.com), or the 3D Face system marketed by Cyberware Inc. (www.cyberware.com), or the 3D face system known as Minolta 3d1500 (www.minolta.com). In this case the software of the imagine system 20 within these off-the-shelf systems is designed to provide the inputs required by the 3D-Face unit 60 within these off-the-shelf units as defined in their user manuals and professional literature. The output of these off-the-shelf units is typically suited to serve as direct input for the fit-frames unit 70 of FIG. 1.

Typically, the input to 3DFace unit 60 comprises 6 per-customer images of the customer's face and head, and, on a one-time basis (i.e. not per-customer) 6 similarly oriented images of a calibration target which is positioned in the imaging system. Typically, commercially available 3D face extractors include a calibration target for use with the imaging system.

The 3D face unit 60 typically generates 3D face information and/or biometric facial features which are archived in a face archive 55 for retrieval as necessary by a fit-frames unit 70. A preferred method of operation for the fit-frames unit 70 is described below with reference to FIG. 3. The fit-frames unit 70 is operative generally to align a customer-selected 3D model of a frame, typically provided by a frames inventory 40 generated by an external source, to the 3D model of the customer's (or a model's) face generated by 3D unit 60 and stored in face archive 55.

The frames inventory 40 typically contains a virtual invento including 3D frame representations which may comprise 3D content files of a multiplicity of frames which may be imported from frame modelling sources working in accordance with a suitable standard such as the Pulse 3D Player standard described at www.pulse.com.

A virtual try-on unit 65 receives 3D information regarding faces, 3D information regarding frames and prescription and option-selection information regarding lenses and provides, for a customer, a visual representation of his face with spectacles, comprising his selected frames and lenses, superimposed thereupon. The virtual try-on unit 65 typically includes the virtual frame fitter 70 and, optionally, a virtual lens fitting and customized lens designer 80.

The customized lens designer 80 typically receives some or all of the following inputs, e.g. from virtual frame fitter 70: pupil distance, frame tilt, vertex distance, prism prescription, frame contour, frame position on the face typically in relation to eye position. The customized lens designer 80 typically generates some or all of the following outputs for customized manufacture and cutting of lenses: for single vision lenses—lens decentration, for bifocal lenses—segment orientation and segment position (decentration); and for progressive lenses—orientation of the lens related to progressive lens positioning.

Suitable formulae for computing the above outputs, for unprismatic or prismatic lenses, are known and are described, for example, in the following textbook: INTRODUCTION TO VISUAL OPTICS, Alan H. Tunnacliffe, distributed by the Association of British Dispensing Opticians.

Preferably, the virtual try-on software 70 determines an appropriate position for the frame on the face. Once this is performed, the virtual try-on software typically modifies its information regarding the frame and the face such that all parameters of the frame and face are expressed in a single coordinate system.

Optionally, the GUI 50 provides the customer with the ability to reject a proposed position and to adjust the position of the frame on his virtual face, manually on the GUI's display screen. Preferably, the customer is given some or all of the following degrees of freedom to adjust the frame/face positioning using GUI 50:

a. Moving the frame up or down along his nose.
b. Pivoting the frame about an axis defined by the top surface of the frames, and falling perpendicular to the axis of sight and along the customer's face.
c. Opening or closing the arms of the spectacle frames.
d. Translating the frame e.g. to the right or left or up or down.
e. Pivoting the frame about an axis extending from the center of the nosepiece of the spectacle frame outward from the customer's face.

Customized lens designer 80 is typically operative to generate parameters for automatic customized manufacture and cutting of lenses for an individual customer's spectacles. The parameters computed by the customized lens designer 80 are customized to the customer's face, frame/face fit, and lenses, and may include some or all of the following: backsurface-eyeball distance, lens decentration, bifocal lens position and orientation, progressive lens fitting point (also termed herein the "positioning mark" of the progressive lens), and lens type. A preferred method of operation for the customized lens designer 80 is described herein with reference to FIG. 4.

The build/display lenses unit 75 typically builds a 3D model of the lenses selected by the customer, based on customer lens preferences elicited by the spectacle fitting GUI 50 and/or on separately provided prescription information. The 3D model of the lenses is superimposed into the 3D model of the customer's spectacled face and the resulting image of the customer's spectacled face including a representation of his own selected lenses is displayed to the customer at the spectacle fitting GUI. A preferred method of operation for the build/display lenses unit 75 is described herein with reference to FIG. 7.

Figure 2:
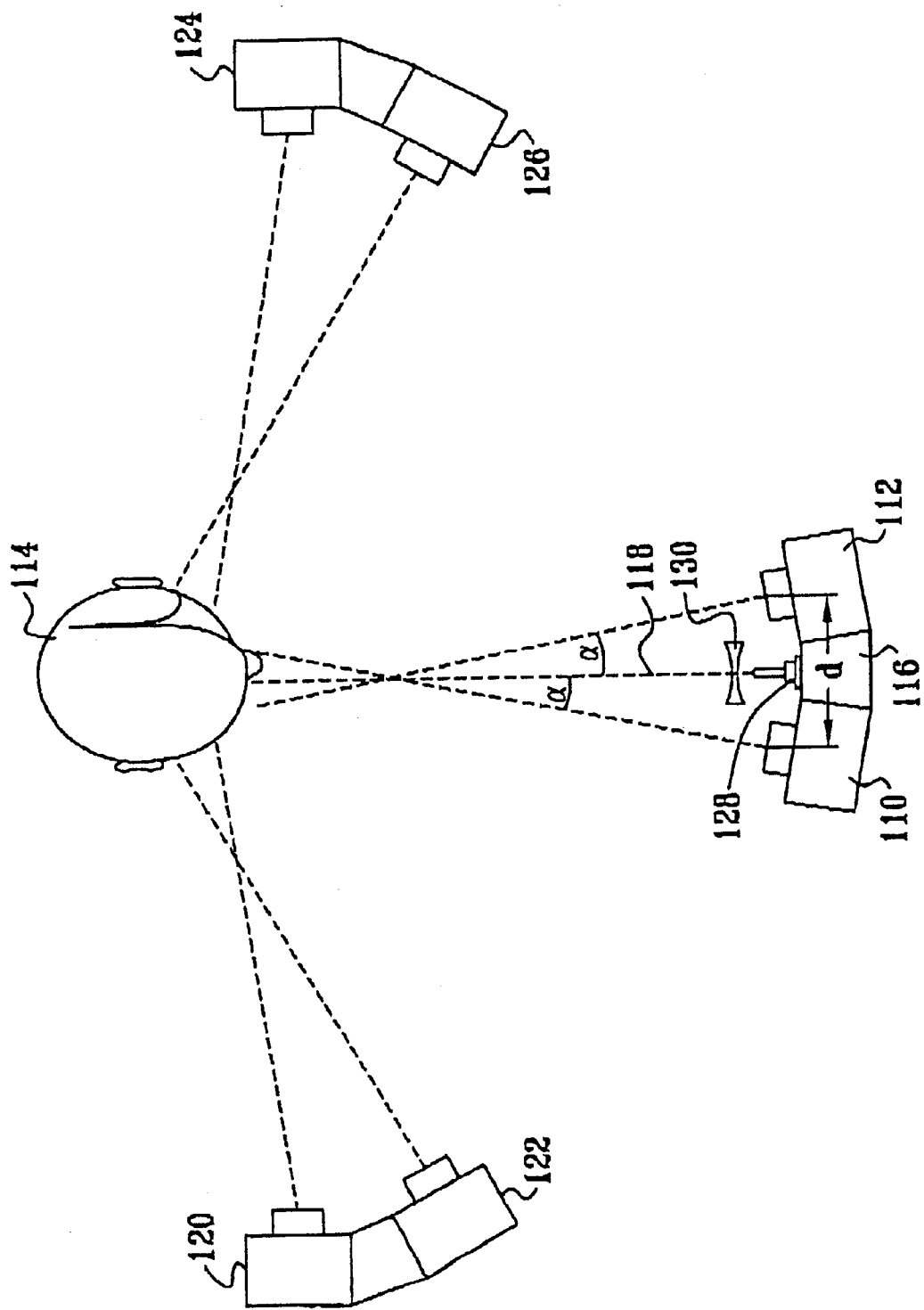
FIG. 2 is a schematic diagram of one implementation of the imaging system of FIG. 1, constructed and operative according to a preferred embodiment of the present invention, for producing a three-dimensional reconstruction of the customer's face.

Reference is now made to FIG. 2, which is a schematic diagram of one implementation of the imaging system 20 of FIG. 1, constructed and operative according to a preferred embodiment of the present invention, for producing a three-dimensional reconstruction of the customer's face. The imaging system 20 typically comprises an array of three pairs of digital cameras, each pair being arranged to image a different three-dimensional view of the customer's head, from which can be generated by means of computer computations of the cameras'digital output data as described below, the desired three-dimensional reconstruction of the customer's face.

A first pair of cameras 110 and 112 are arranged so as to provide a digital image of a front view of the head of the customer 114. The pair of cameras 110 and 112, are preferably gripped in a mounting assembly 116, which holds the cameras in a mutual disposition such that their imaging lenses are a predetermined distance d apart, and each of their optical imaging axes are inwardly inclined at a predetermined angle alpha from a direction 18 normal to the front surface of the mounting assembly. The distance d and the inclination angle alpha are selected such that a stereoscopic pair of images, having a known triangulation relationship, are obtained of the customer's face.

The output digital signals from these two cameras thus provides sufficient data to generate a three dimensional electronic image of the front view of the customer's face. The distance d is preferably of the order of 15 cm, and the angle alpha, of the order of 6 degrees. These preferred values, as is known from the field of stereoscopic imaging, provide suitably adapted image data to generate an accurate and lifelike three dimensional image at a customer location distance of approximately 30 cm from the camera pair, this being a typically convenient distance for viewing the customer's complete face details.

Two further pairs of digital cameras are typically provided, each pair mutually mounted in a similar manner to that described for cameras 110 and 112. One pair of cameras 120 and 122 are located to one side of the customer's head, the right side in the embodiment shown in FIG. 1, to provide a three dimensional view of the face from that side, while the other pair 124 and 126, are located to the other side of the customer's head, the left side in the embodiment shown in FIG. 2, to provide a three dimensional view of the face from that side.

Though the side view camera pairs are shown in FIG. 2 directed at approximately 70 degrees to the imaging direction of the front view camera pair 110 and 112, it is to be understood that they do not have to be at this angle, but that any preferred convenient side angle may be used, conditional on their location being such that they are able to supply appropriate imaging data about the side view of the customer's face. The side pairs of cameras are located at a similar distance from the customer's head as the front view camera pair, such that the complete imaging system may occupy a floor space of approximately 50 cm x50 cm, this being significantly less than prior art systems mentioned hereinabove.

The stereoscopic data from the images supplied by the three camera pairs are input into a computing system where the three separate three-dimensional views undergo a conventional registration procedure, which may be conventional, or alternatively in accordance with methods of further preferred embodiments of the present invention. However, in order to ensure that the three separate sets of stereoscopic image data are interfaced in such a manner that the electronic data from one set can be related to the other two sets, and a smooth transition from one set to the others be achieved, a calibration procedure is preferably performed, typically during set-up alignment of the system, either in the assembly plant, or after installation on site, or if necessary, after transport of the system from one site to another.

A calibration target test plate having a predefined image, selected to have good focusing and three dimensional visual resolution qualities, as is known in the art, is located in the approximate position where the customer is to sit during subsequent imaging of his face. The calibration target (test plate) is imaged by all three camera pairs, either simultaneously or sequentially without moving the test plate, and the image data input to the computing system. In this computing system, a program, operating according to a further preferred embodiment of the present invention, analyzes the 3-D image data of the calibration target as output from all three camera pairs, and adjusts the data to ensure correct registration of the images obtained from all three camera pairs.

This registration process enables the imaging program described hereinbelow, according to yet another preferred embodiment of the present invention, to generate a realistic three dimensional view of the customer's face, for viewing on the system monitor screen. The facial view can be observed from any frontal or side angle covered by the camera pairs, and the angle of view, including both zoom and rotation, continuously and smoothly varied according to the user's preference. The texture of the face and the depth of the features thereon are displayed. In addition, a range of biometric measurements necessary for the individual matching of spectacle frames to each particular customer is output by the imaging program.

One problem of providing biometric measurements of the customer's ophthalmic features arises from the use of a compact measuring range, as is provided in the above-mentioned preferred embodiments of the present invention. As is known, the pupil distance of a subject physiologically varies according to the distance at which the subject's eyes are focussed. When the eyes are focused at a close object, the eyeballs. rotate inwards slightly. As a result, the pupil distance contracts from its rest value for an eye focused at infinity. Since the imaging system according to the above described preferred embodiments of the present invention, is of compact dimensions, the customer's eyes, when looking at the front imaging camera pair, are focused at about 50 cm, and the pupil distance measured would thus be smaller than the natural rest pupil distance.

In order to compensate for the close distance of the imaging camera pairs, a small object, such as an illuminated LED 128, is preferably located on the front surface of the mounting assembly 116 of the front view camera pair, and a negative lens 130 interposed between the customer's eyes and the LED. The power of the negative lens and its distance from the LED are selected such that the virtual image of the LED appears to the customer to be at infinity, and his pupil distance becomes spaced accordingly.

Referring again to FIG. 1, the imaging system 20 typically comprises a customer interface which typically prompts first time customers to register and prompts registered customers to access their account e.g. via a user ID and/or password.

After the initial registration procedure, the customer is typically instructed regarding self-operation of the imaging system including body positioning e.g. by a suitable screen display. For example, the customer may be instructed to approach the imaging system e.g. until his body touches the counter and then to adjust the seat elevation up or down until his eyes are bisected by a horizontal line drawn on a mirror appearing on the user-facing surface of the front cameras (as opposed to the two pairs of side cameras). The customer is prompted to press a Start button when he is in position. The customer's face is then imaged. Preferably, once the customer's face is imaged, the customer's face is displayed and the customer is prompted to accept or reject his image. If the image is rejected, the imaging process repeats itself. Once the customer has accepted his image, the system informs the customer of his user name and/or password and informs the customer that lie can now select spectacles using the spectacle fitting GUI 50 which typically resides in a separate kiosk.

Figure 3:
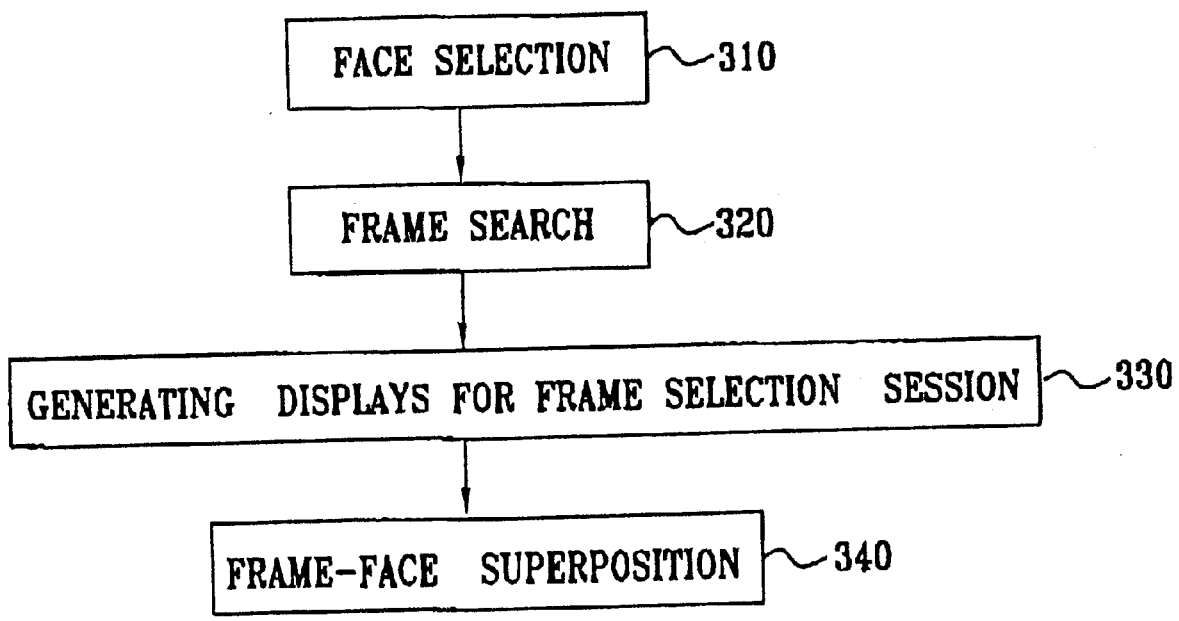
FIG. 3 is a simplified flowchart illustration of a preferred method of operation for the fit-frames unit of FIG. 1.

FIG. 3 is a simplified flowchart illustration of a preferred method of operation for fit-frames unit 70 of FIG. 1. The method of operation for fit-frames unit 70 typically comprises the following steps:

Face selection 310: The frame fitter 70 prompts the customer to provide, and accepts therefrom, a customer's selection of a virtual face, typically either his own or that of a model, from among a multiplicity of such faces stored in the face archive of FIG. 1.

Frame Search 320: The frame fitter 70 searches the frames inventory 40 and extracts therefrom a subset of frames which are a priori suitable to the customer's facial and demographic (e.g male/female; adult/child) attributes. Preferably, the frame inventory comprises a multiplicity of records each including a 3D representation of a frame associated with a frame profile, used to perform the frame search procedure. The frame profile typically comprises demographic attributes of the frame and at least one biometric facial feature of the frame. This last portion of the frame profile is matched to the biometric facial feature of the face selected in the above Face Selection step, using the biometric facial features stored in the face archive of FIG. 1 which were derived by 3D face extractor 60 of FIG. 1.

Examples of selection/rejection processes include but are not limited to:

a. The frame fitter may perform optional or mandatory selection on the basis of biometric facial feature-guided aesthetics e.g. rejecting round frames for round-faced customers.

According to a preferred embodiment of the present invention, the face selection step 310 includes a pre-selection step in which frames are pre-selected for a customer on the basis of suitability to the customer's 3D facial morphology, using conventional image processing methods to categorize or quantify the customer's 3D facial morphology on the basis of the available 3D information regarding the customer's face.

b. The frame fitter performs selection on the basis of prescription-related considerations e.g. rejecting frames not suitable for heavy lenses, if the optical power of the prescription is high.

c. The frame fitter may perform selection on the basis of biometric facial feature-guided pre-fitting e.g. rejecting frames which are narrow in the across-the-face dimension for customers having wide flat faces.

The frame search procedure is preferably also guided by additional customer-preference keys including but not limited to physical and commercial properties of the frame e.g material, shape (round, rectangular, oval, cat-eye), size (wide/narrow), material, cost.

Generating Displays for Frame Selection Session 330: The frame fitter, after prompting the customer to provide his preferences, typically displays to the customer small images of some or all of the frames which fall within the subset of frames which were identified in the above Frame Search process. The customer is prompted to select a frame and typically, responsive thereto, a large, detailed 3D image of the selected frame and information regarding the frame are displayed. The display preferably comprises a customer control panel enabling the customer to view the frame from any angle. The customer control panel also typically comprises a "Select" button which the customer may use to indicate that he wishes to observe a virtual try-on for a particular frame on the face he selected in the above Face Selection step.

Frame-Face superposition 340: The frame fitter aligns the customer-selected frame onto the customer-selected face. Typically, each record in the frame inventory 40 stores frame characteristics including frame-to-face alignment characteristics such as the following two frame characteristics:

a. location of center of frame nosebridge, expressed in the coordinate system in which the frame is represented.
b. location of facial contact point on each arm of spectacles, expressed in the coordinate system in which the frame is represented.

Typically each record in the face archive of FIG. 1 stores matching frame-to-face alignment characteristics such as the following two facial characteristics which respectively match the above two frame characteristics:

a. location of center of facial nosebridge, expressed in the coordinate system in which the face is represented.
b. location of frame contact point adjacent each ear, expressed in the coordinate system in which the face is represented (two locations, one for right ear and one for left ear).

It is appreciated that the particular frame-to-face alignment characteristics employed herein are exemplary and are not intended to be limiting.

The 3D representation of the selected frame stored in the frame inventory is superimposed onto the 3D representation of the selected face stored in the face archive, according to the alignment defined by bringing the locations defined in frame characteristics (a) and (b) into alignment with the locations defined in facial characteristics (a) (one location) and (b) (two locations, one on the right and one on the left), respectively.

Fine-tuning of frame to face alignment: Preferably, the customer is prompted to perform a fine-tuning of the virtual frame to the virtual face. The frames fitter 70 is operative to generate a suitable display, for each customer-selected combination of fine-tuning parameters (such as roll, pitch, yaw, forward/back displacement, left/right displacement, up/down displacement)

If the roll is incremented/decremented, then the right and left frame contact points are rotated proportionally about the front-back horizontal axis defined by the facial nosebridge centerpoint.

If the pitch is incremented/decremented, then the right and left frame contact points are rotated proportionally about the right/left horizontal axis defined by the facial nosebridge centerpoint.

If the yaw is incremented/decremented, then the right and left frame contact points are rotated proportionally about the vertical axis defined by the facial nosebridge centerpoint.

If the forward/backward displacement is incremented/decremented by the customer, then the facial nosebridge centerpoint and right and left frame contact points are all displaced proportionally forward or backward.

If the left/right displacement is incremented/decremented by the customer, then the facial nosebridge centerpoint and right and left frame contact points are all displaced proportionally left or right.

If the up/down displacement is incremented/decremented by the customer, then the facial nosebridge centerpoint and right and left frame contact points are all displaced proportionally upward or downward.

Figure 4:
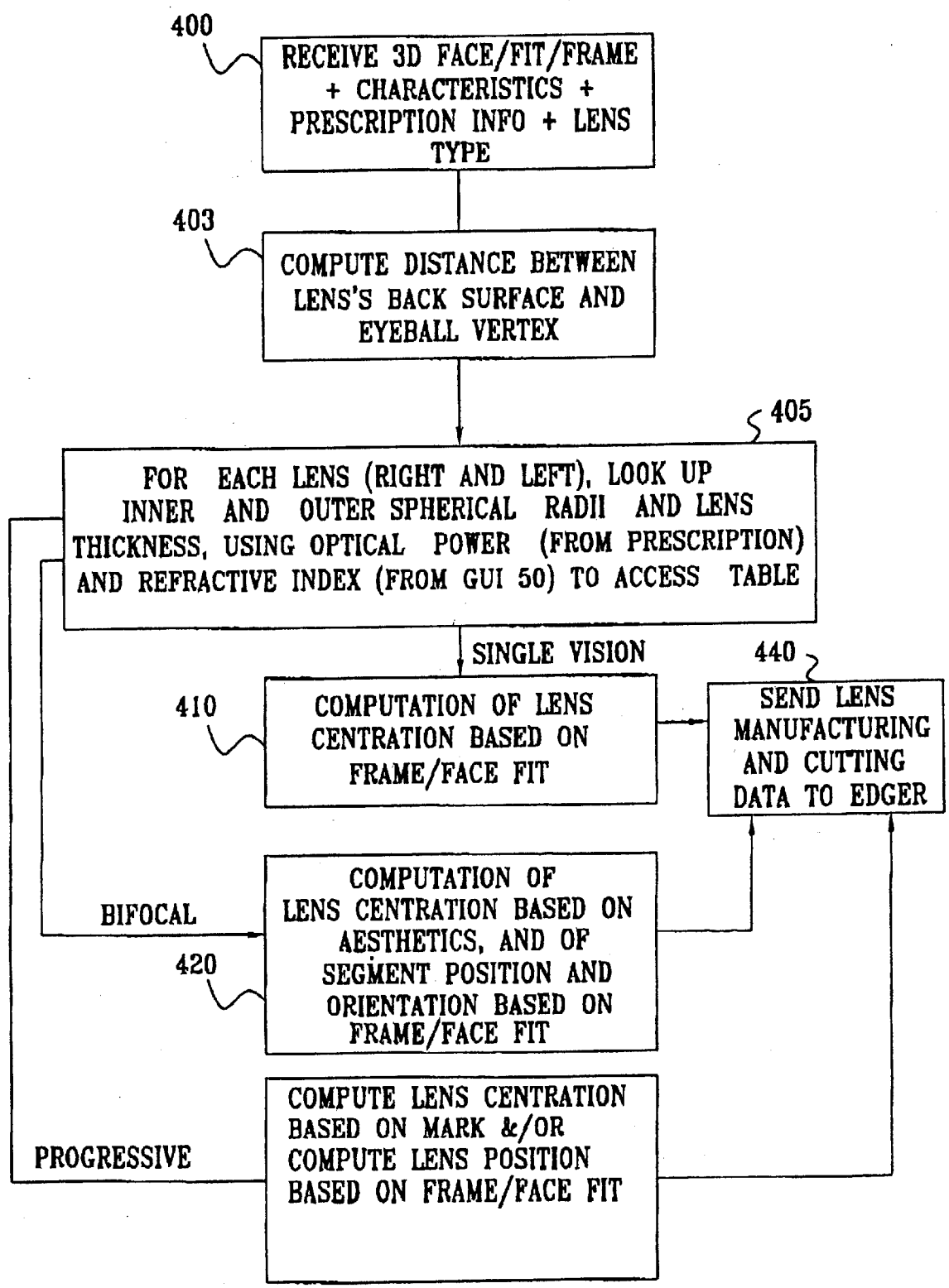
FIG. 4 is a simplified flowchart illustration of a preferred method of operation for the customized lens design unit of FIG. 1.

FIG. 4 is a simplified flowchart illustration of a preferred method of operation for the customized lens design unit 80 of FIG. 1. As shown, in step 400, the fit-lens unit receives a virtual 3D model of a human face wearing the customer-selected frame. Also received are frame/face fit characteristics derived by the virtual try-on unit 70 of FIG. 1 also termed herein FFF characteristics. Also received is prescription information e.g. power, sphere, cylinder, axis and prism. Also received is lens type information e.g. the material (glass, polycarbonate) from which the lens is to be made, whether the lens should be tinted, antiscratch specification, and so on.

If the prescription information indicates that the lens is a single vision lens, step 410 is performed. If the prescription information indicates that the lens is a bifocal lens, step 420 is performed. If the prescription information indicates that the lens is a progressive lens, step 430 is performed. In step 410, the unit 80 computes lens decentration based on the far vision pupillary distance (PD) which is typically one of the biometric facial features computed by the 3D face modeller and feature extractor 60. Preferably, better visual comfort will be provided by computing decentration taking into account also vertex distance and frame tilt. In step 420, the lens decentration is computed based on the far vision PD and/or near vision PD (segment position), both of which biometric facial features are preferably received from unit 60. Segment position may also be computed based on a perfect merge of the reading zone field of view. Other biometric facial features which may be taken into account may include vertex distance frame tilt and frame axis. Also computed by unit 80 in step 420 is the segment orientation suitable for the customer's facial contours, typically based at least partly on the horizontal axis of the frame.

In step 430, the fitting point of the progressive lens, also termed herein the "lens mark", which is typically received as an external input from the lens manufacturer, is used to compute decentration. For better visual comfort the progressive lens position may be computed similarly as with a bifocal lens, thereby to optimally merge the near zone field of view using similar biometric frame/face fit characteristics.

In step 403, unit 80 computes the distance between the lens's back surface and the eyeball vertex, once the lens-bearing frame has been virtually fitted onto the client's virtual face to his satisfaction. The position of the eyeball is typically computed by the 3D face unit 60. The thickness of the lens is typically computed by the virtual try-on software from the prescription information particularly regarding power, and from the lens type (e.g. due to the effect of the refractive index).

In step 440, output is generated which is sent on to the edger and/or the manufacturer including the above parameters generated in steps 410, 420 or 430, and 403, and the frame border which typically arrives from an external source such as the frame manufacturer.

Referring again to FIG. 1, according to a preferred embodiment of the present invention the input data to unit 70 typically includes, inter alia:

a. Pupil distance, typically as derived by the 3D face extractor from the images of the customer supplied by the imaging system 20.
b. temple-to-temple distance, typically as derived by the 3D face extractor from the images of the customer supplied by the imaging system 20.
c. Local minimum along the central vertical axis of the face which defines the interface between the forehead and the nose, typically as derived by the 3D face extractor from the images of the customer supplied by the imaging system 20.

The input data to unit 80 may comprise the following:

a. Pupil distance, typically as derived by the 3D face extractor from the images of the customer supplied by the imaging system 20.
b. Corneal-vertex 3D position, typically as derived by the 3D face extractor from the images of the customer supplied by the imaging system 20.
c. Frame horizontal axis—the position on the customer's face of a horizontal axis intersecting the bottom points of both frame boxes. This frame/face fit characteristic is typically computed by the fit frames unit 70, based on per-frame horizontal axis location information which is typically stored in the frames inventory 40.
d. Boxing position—the locations on the face of the boxes which circumscribe the particular contour of the individual frame. This frame/face fit characteristic is typically computed by the fit frames unit 70, based on per-frame boxing position information which is typically stored in the frames inventory 40.
e. Frame tilt—a suitable measure is the angle between each arm or at least one arm and the optical axis of the spectacles.

The output of unit 80 typically depends on the type of lens to be produced. The output of unit 80 for a single vision lens typically comprises the following manufacture and cutting information:

a. Decentration—desired displacement of the optical center of the lens from the geometric center of the box circumscribing the frame contour. Typically the displacement is vertical and depends on some or, for better visual comfort, all, of the following biometric facial features and frame/face fit characteristics: the frame tilt, pupil distance and back lens vertex 3D position, also termed herein the "back vertex distance", "corneal vertex distance", or "vertex distance". This information is typically employed in conjunction with frame contour data in order to cut the lens.

Figure 5A:
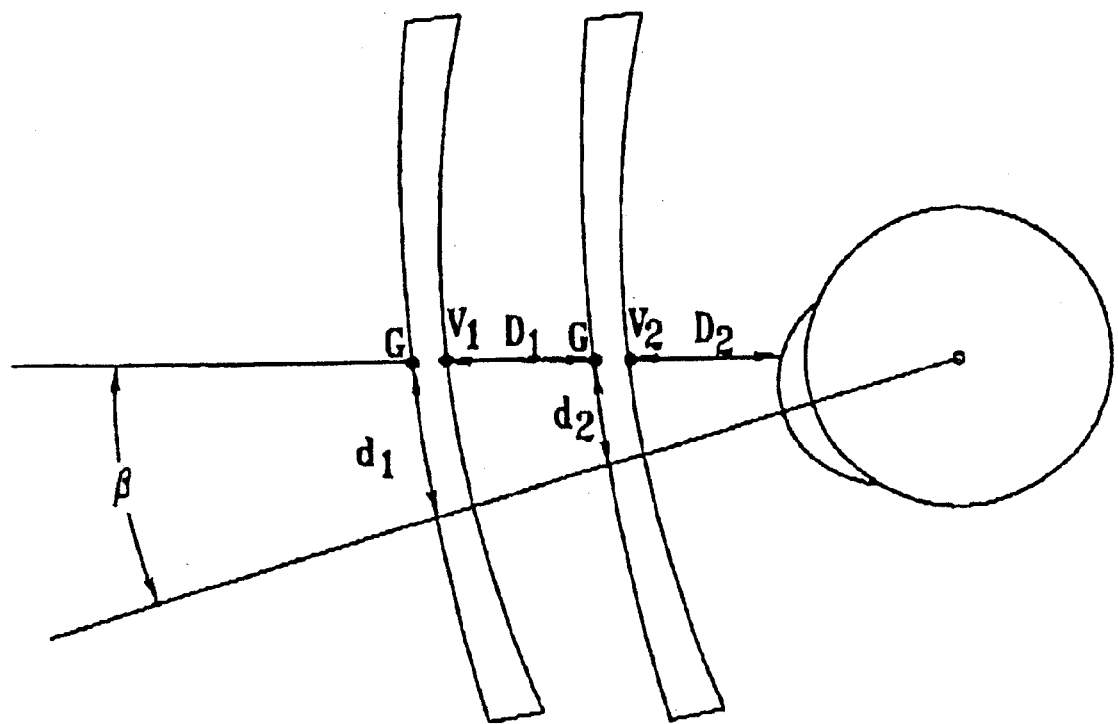
FIG. 5A is an optical diagram showing that the decentration of a lens mounted into spectacles depends on the distance of the back vertex of the lens from the cornea.

As shown in FIG. 5A, the decentration d of a lens mounted into spectacles depends on the distance of the back vertex V of the lens from the cornea. In FIG. 5A, d1 is determined by the distance of V1 from the cornea which is D1+D2, and d2, which is smaller than d1, is determined by the smaller distance of V2 from the cornea which is D2. The decentration of each lens refers to the distance between the optical center of the lens, OC, and the geometric center of the box, G. For lens with a prism, the computation is typically the same except that decentration due to the prism itself, which may be horizontal or vertical, is added vectorially to the decentration due to the back vertex distance.

b. Frame contour—typically as stored in the frames inventory 40.

One of the common causes for the lack of visual comfort to many subjects with bifocal or progressive lenses arises from the lack of an accurate merge of fields of view of the various segments, because of incorrect segment alignment of the lenses. This effect, which is also known as decentration of lens segments, is now illustrated by reference to FIGS. 5B and 5C, which are schematic illustrations showing the relationship between various ocular parameters and a typical progressive lens. Though the effect is illustrated in FIGS. 5B and 5C using progressive lenses, it is to be understood that the same effect is present, and can be taken account of according to preferred embodiments of the present invention, in the case of bifocal or trifocal lenses.

Figure 5B:
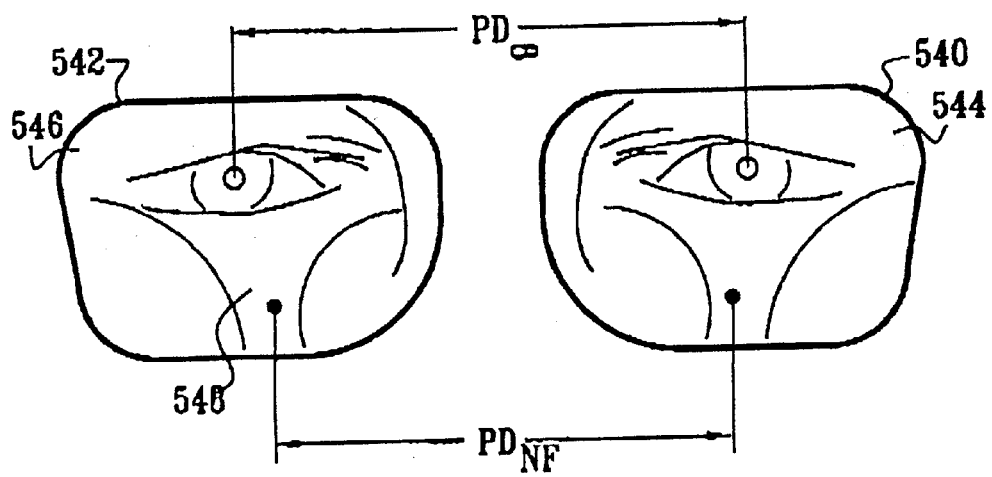
FIGS. 5B and 5C are schematic illustrations showing the relationship between various ocular parameters and a typical progressive lens.

FIG. 5B, there is shown a pair of progressive spectacle lenses 540 and 542, with the eyes 544 of the subject looking through them. When the subject is looking at infinity, through the top segments 546 of the lenses, his pupil distance PDnf is maximal, and the distance between the optical centers of the upper segments of the left and right lenses is typically equal to this value of PDinf. Because of the limitations of the shapes of frames, and because of the topology of the typical subject's facial features, the center of the lens is not, in general, coincidental with the center of the frame aperture.

As, however, the subject focuses on closer objects, his pupil distance becomes smaller, as explained hereinabove. Therefore, with properly prescribed spectacles, the optical centers of the corridors 548 of the lenses should move inwards with progression down the height of the lens, to follow the contraction of the pupil distance. Eventually, for the closest comfortable vision in the near field, such as when reading a page at about 30 cm, when the pupil distance is PDnf, the distance between the optical centers of the lowest segment of the corridor should also be reduced to this value, The difference between PDinf and PDnf schematically shown in FIG. 5B has been exaggerated, in order to more clearly illustrate the effect.

Figure 5C:
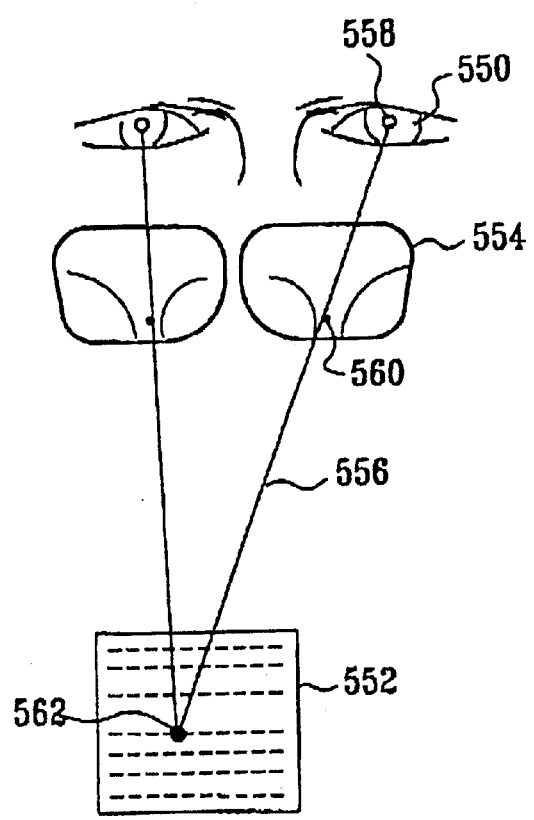

Reference is now made to FIG. 5C, which is a schematic illustration of this near field position. The eyes 550 of the subject are shown reading from a page 552 through the bottom segment of his spectacle lenses 554. At that focusing distance, the pupil distance is contracted, and the correct distance apart of the optical centers of the bottom-most segment of the lens is given when lines 556 drawn from the pupil positions 558 on the front surface of the cornea of the eye, through the optical centers 560 of the bottom-most segments, intersect at a point 562 lying on the plane of the page being read.

Prescription of multifocal spectacles should correctly take into account the effect of merge of fields of view This depends on a number of parameters, including the vertex distance (the distance from the front surface of the cornea to the back surface of the lens), the near vision pupil distance, the reading distance, and the pantograph angle of the frames chosen by the customer. With prior art methods of measurement used in prescribing spectacle lenses and fitting them correctly to frames suitable for the user, the complexity of performing these measurements is such that in a significant number of cases, decentration of the lens segments is not achieved correctly, and the spectacles prescribed are not visually comfortable.

According to another preferred embodiment of the present invention, all of the above mentioned characteristic measurements are performed automatically on a three dimensional view of the customer's head, with the spectacle frames of his choice mounted thereon, and the lenses can thus be prescribed having accurate decentration throughout all of their segments.

Figure 6A:
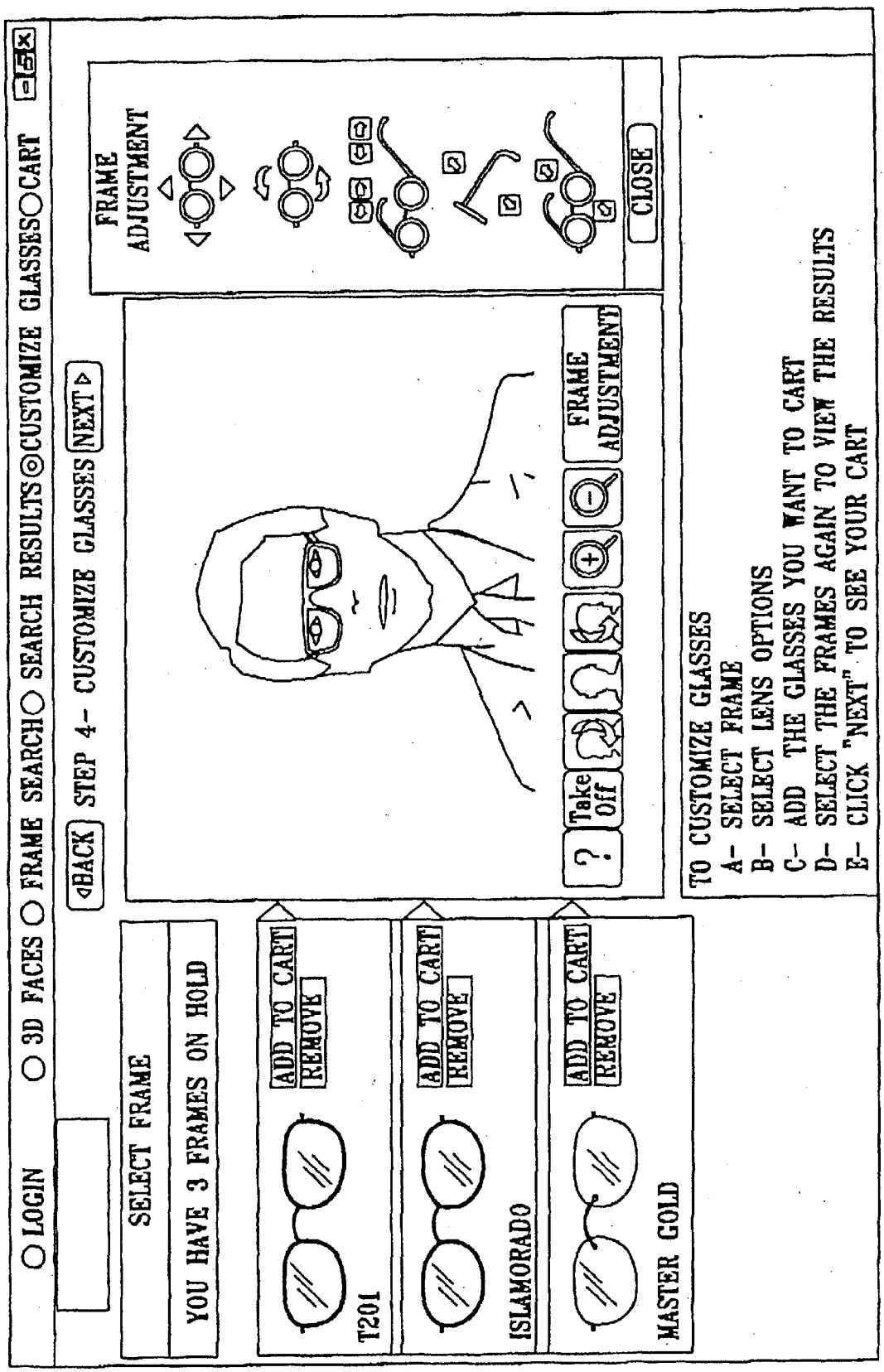
FIGS. 6A–6B are simplified pictorial illustrations of screen displays which may be generated by the spectacle fitting GUI of FIG. 1.
Figure 6B:
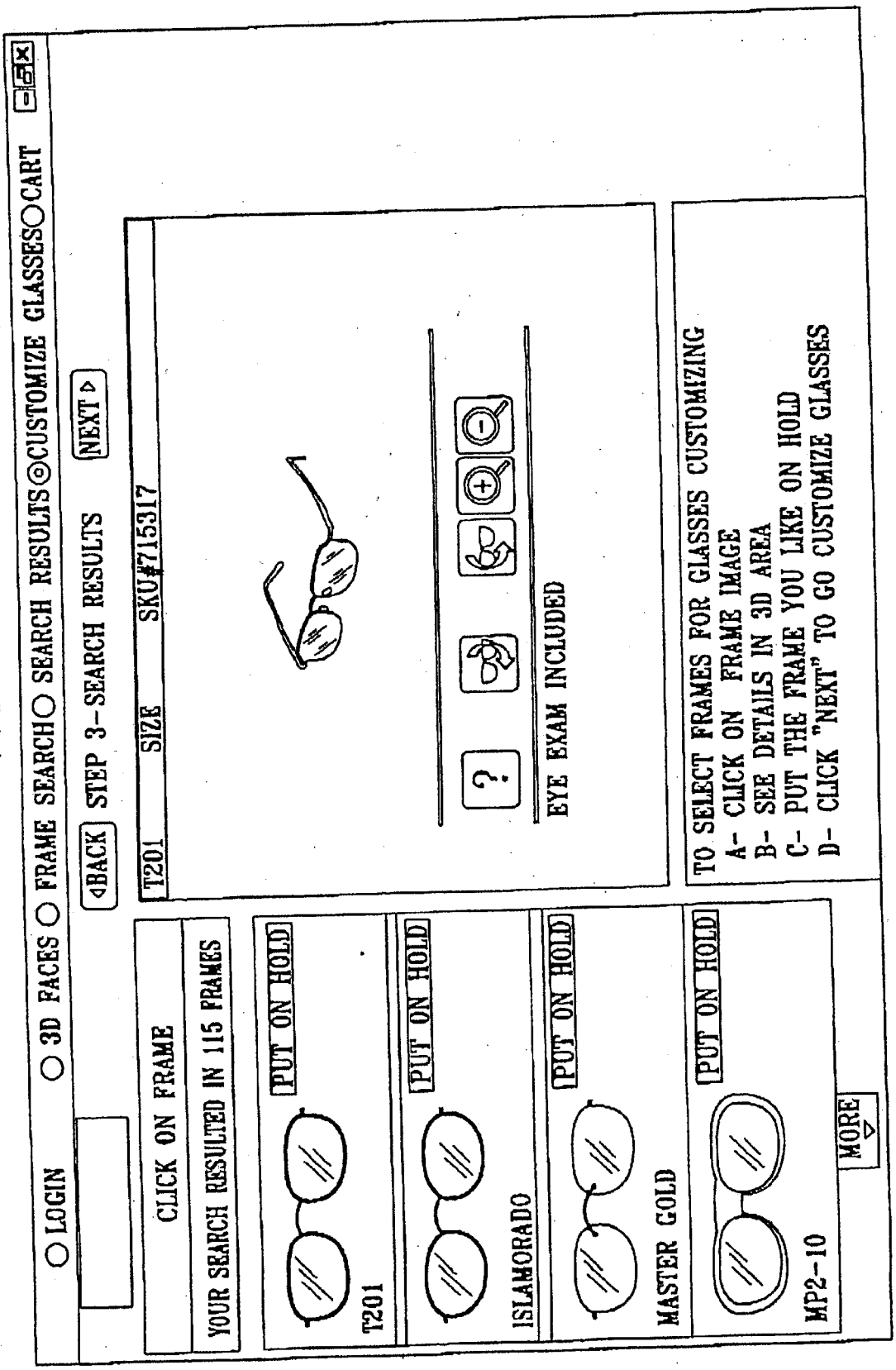

FIGS. 6A–6B are simplified pictorial illustrations of screen displays which may be generated by the spectacle fitting GUI 50 of FIG. 1. Initially, the customer is prompted to access his own face, if it exists in the system, or to access a model's face. Next, a customer who has elected to access a model's face is prompted to select a model from among various models. A 3D view of each model's face is available to the customer. The customer is then prompted to initiate a model search process, by any suitable search method such as but not limited to the following:

a. Searching by a known frame model number;
b. Searching by a frame profile including a logical combination of at least one frame attribute stored in frame inventor 40 such as type, material, price, frame contour (oval, rectangular, round, cat-eye), manufacturer, color. Typically, at least one frame-attribute is used automatically by the system to customize the inventory to the customer such as gender, facial size, facial shape (elongate, wide, round) and age category.

FIG. 6A is a simplified pictorial illustration of a pictorial menu of all frames falling within the customer- and system-defined search criteria which may be displayed to the customer at the culmination of the search process. The customer typically selects one or more frames to view, responsive to which a 3D view of the frame and a display of its attributes is provided to the customer for his inspection. Each frame in the menu can typically be tagged by the customer, using a "put on hold" button, for trying on.

FIG. 6B is a simplified pictorial illustration of a try-on session in which a frame, typically selected using the selection process shown above and the frame identification process of FIG. 6A, is fitted to the customer's 3D face as stored in the system. The interface allows a customer to adjust the frame, if the view of the frame superimposed onto the face is unsatisfactory to him, by using adjustment controls typically allowing the customer to control all degrees of freedom corresponding to the actual degrees of freedom that exist in real-life adjustment of a spectacles frame on the face of a customer. Typically, the customer is prompted to check the 3D display of his spectacled face and make use of the adjustment controls If the 3D display does not resemble the facial and head orientation and position at which he customarily wears his spectacles. An additional set of controls is typically provided in FIG. 6B in order to enable the customer to view his spectacled face from any angle and zoom.

At this point, the customer is typically prompted to select lens characteristics such as solid tint, photochromic (weather-dependent) tint, anti-reflectiveness, anti-scratch, UV protection, optical type (bifocal/progressive), lens material, and refractive index of lens glass. For lens characteristics that affect the appearance of the spectacles, the customer typically can view the spectacles as they appear with lenses having any characteristic he selects. For lens characteristics that affect the wearer's view of the world, a display is typically provided which shows a scene as it appears with and without the selected lens characteristic. For example, if the customer selects a photochromic lens, the system optionally displays to the customer a scene as observed without photochromic lenses and a scene as observed with photochromic lenses in different weather conditions.

If the fitting session takes place on a model, or if for any other reason, the customer's prescription has not entered the system, the customer is prompted to enter his prescription information.

Preferably, the system is operative to display to a customer all parameters of his order, for his final approval.

Preferably the display of the customer's spectacled face in FIG. 6B is generated to take into account at least some and preferably all parameters of the spectacles including the prescription information and other lens information. For example, the displayed thickness of the lens in the customer's 3D spectacled face is typically determined by the optical power specified in the prescription. Typically, other lens parameters also affect the thickness of the lens displayed to the customer in the context of the spectacled face such as the optical type of lens and the refractive index of the lens glass. In the illustrated embodiment, a display which takes into account lens parameters is generated by replacing a standard 3D lens object included in each 3D frame image in the frames inventory 40 of FIG. 1, with a user-specific 3D lens object computed by lens build/display unit 75 of FIG. 1 as described in detail herein with reference to FIG. 7.

Figure 7:
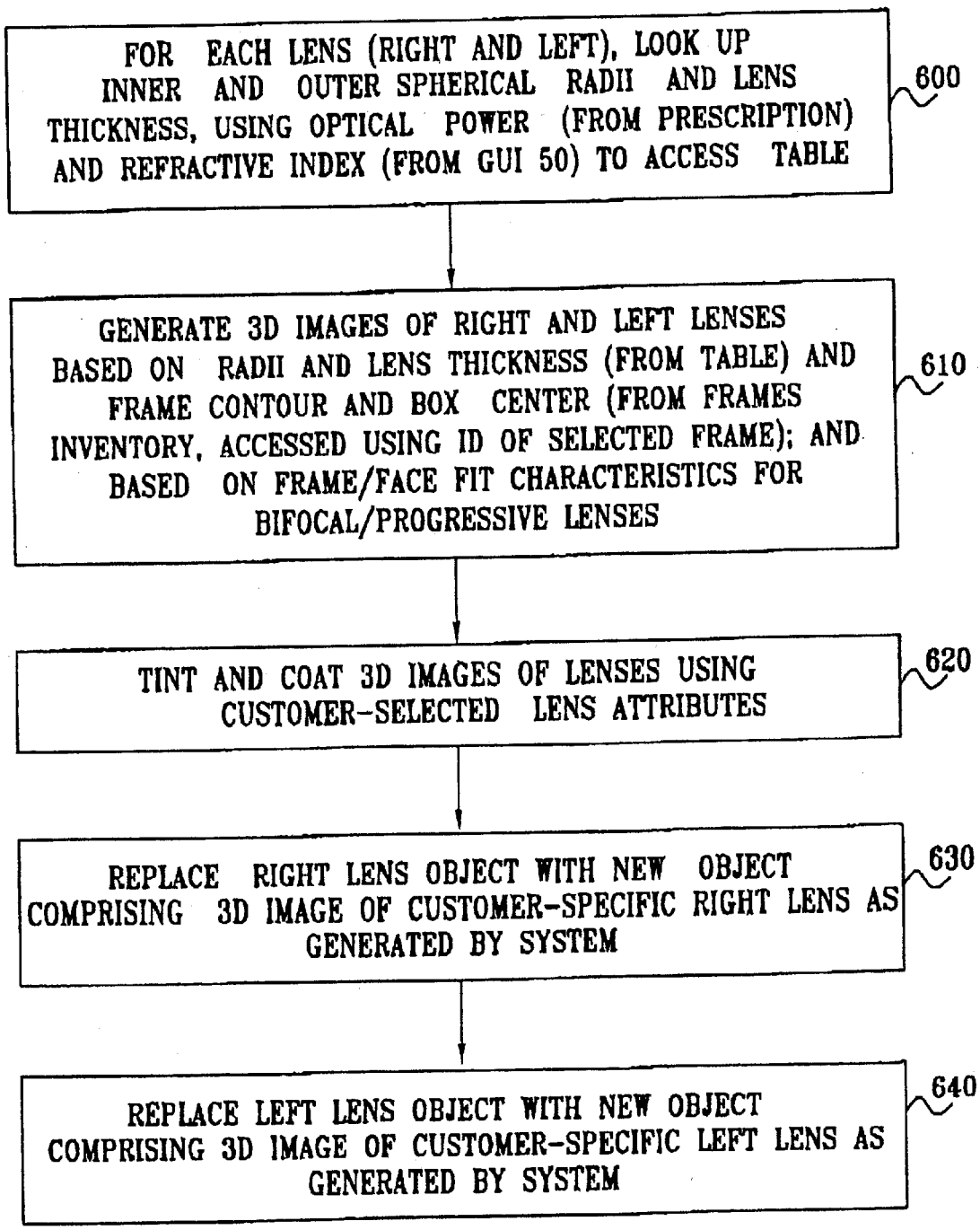
FIG. 7 is a simplified flowchart illustration of a preferred method of operation for the lens build/display unit of FIG. 1.

FIG. 7 is a simplified flowchart illustration of a preferred method of operation for the lens build/display unit 75 of FIG. 1. As shown, in step 600, performed for each lens (right and left), the system looks up inner and outer spherical radii and lens thickness, using optical power (from the customer's prescription as input into the system) and refractive index (from GUI 50) to access a suitable table which is conventionally employed by lens manufacturers.

In step 610, the system generates 3D images of right and left lenses based on radii and lens thickness (from the table) and frame contour and box center (from the frames inventory 40, accessed using the ID of the frame selected by the customer). For bifocal and progressive lenses, the 3D lens images are based on suitable frame/face fit characteristics generated by the fit frames unit 70 of FIG. 1. Generation of a 3D image with bifocal or progressive characteristics may be similar to the handling of bifocal and progressive lenses as described below with reference to FIG. 4.

In step 620, the system tints and coats the 3D images of lenses using customer-selected lens attributes. This is done by suitably modifying the color and opacity of the relevant pixels, and superimposing a suitable scene into the lens pixels, for reflective lenses.

In step 630, the system replaces the right lens object with a new object comprising the 3D image of the customer-specific right lens as generated in steps 610 and 620. Step 640 does the same for the left lens.

FIGS. 8A–17D are diagram illustrations of tables which together form a database serving the system of FIG. 1. The specific structure and contents of the database is described by way of example and is not intended to be limiting. The database described by these figures includes the frame inventory 40 and face archive 55 of FIG. 1.

Suitable equations for computing displacement are known in the art and are described in the Tunnacliffe textbook referenced herein.

The output of unit 80 for a bifocal lens typically comprises the following manufacture and cutting information:

a. Cosmetic position—positioning of the segment along a horizontal line, by taking into account the asymmetry which often exists between the two sides of the face resulting in a tilted horizontal axis of the frame.
b. Decentration—This may be determined generally as described above. However, the computation for the segment position of the bifocal lens additionally takes into account the matching of the field of view between the left and right eyes.
c. Frame contour—typically as stored in the frames inventory 40, The output of unit 80 for a progressive lens typically comprises the following manufacture and cutting information:

a. Decentration—this may be computed as described above for bifocal lenses except that the lens mark is taken into account in the computation.
b. Adjustment of the near vision position to accommodate frame size—It sometimes occurs that the theoretically correct near vision position falls outside of the frames because the frames are relatively small If this occurs, the decentration computed in (a) is shifted vertically, typically as little as possible, but so as to bring the near vision position into the frame contour to facilitate functional near vision position.
c. Frame contour—typically as stored in the frames inventory 40.

It is appreciated that various biometric facial features, such as pupil distance, temple-to-temple distance, corneal-vertex 3D position and others, are typically derived by the 3D face extractor from the images of the customer supplied by the imaging system 20. However, alternatively, these may be manual inputs derived manually by measuring directly from the customer's face.

It is appreciated that the particular frame/fit characteristics and biometric characteristics shown and described herein are merely exemplary and are not intended to be limiting.

Optionally, the system shown and described herein is operative to display, side-by-side or otherwise simultaneously, two or more identical faces each wearing different frames, or different color frames, or the same frames with different lens options, all in order to enable a customer to perform a visual comparison between two different purchasing options.

Optionally, the system shown and described herein is operative to display views of the world as will be seen by the customer through lens having various different options such as but not limited to tint, photochromaticity for weather adaptability, bifocal vs. progressive antiscratch, antireflection. Preferably, the various options between which a customer is deliberating are displayed simultaneously.

Preferably, the system shown and described herein is operative to automatically determine cost of spectacles including frame, lens and accessories (e.g. either by real time computation or by looking up in a suitable table) factoring in frames, lens material and other lens options, accessories, deals and special offers. The system preferably provides a side-by-side purchase option display by allowing a customer to define a set of candidate spectacles that he may wish to purchase and to see a display of himself or a model, duplicated a plurality of times, wearing each of the plurality of candidate spectacles he has defined, where each spectacled image appears adjacent to a displayed indication of the price of those spectacles.

Preferably, the system shown and described herein performs, for at least some customers, preselection of frames including identification of a subset of frames in the inventory 40 suited to the customer, based on the 3D facial morphology of the customer and based on knowledge regarding the aesthetic and/or functional desirability of different frames for different facial morphologies. Such knowledge is described, for example, in a textbook termed "*Envision yourself*", distributed by The Vision Council of America, 1994 (reprinted in 1996), particularly *Section II: Face Shape Analysis,* the paragraph entitled "Choosing frames to complement face shape".)

A CD-ROM Appendix is enclosed herewith from which can be derived files which, taken together, constitute a preferred software implementation of a system constructed and operative in accordance with a preferred embodiment of the present invention.

In order to generate the above system based on the enclosed CD-ROM, the following method may be employed:

Server Computer

1. Provide an Intel compatible computer with a minimum of 128MB RAM and a Pentium IV central processing unit and install the following:

1.1. A Microsoft Windows 2000 Server operating system version 5.0 or newer version;

1.2. An Internet Information Server (hereinafter referred to as 'IIS') version 5.0 or newer version;

1.3. A Microsoft Data Engine (hereinafter referred to as 'MSDE') version 1.0 or newer with service pack 3.0 or newer service pack;

1.4. A Microsoft Internet Explorer version 4.0 or newer version.

2. Copy the file 42434cdr.hex in the root folder stored in the appended CD-ROM into a temporary directory.

3. Unhex the computer listing 42434cdr.HEX mentioned in step 2 using HEX IT V1.8 or higher by John Augustine, 3129 Earl St., Laureldale, Pa. 19605 creating file 42434cdr.ZIP 4. Decompress the file 42434cdr.ZIP created in step 3 using WINZIP version 6.2 or higher, extracting all files into a temporary directory ("<Temp dir>") using the option 'use folder names'.

5. Database Installation:

5.1. Create directory D:\backup.

5.2. Copy all files from <Temp dir>\database to D:\backup.

5.3. Open in edit mode file new_db.sql and change in row 13 (EXEC sp_addlogin '3diview#Site', 'xxxxxx', 'web3diview') the xxxxxx to the password "maga3ledo".

5.4. Go to the command prompt and execute the file 'NewDBrun.bat' located in the directory D:\backup 6. Create the ODBC connection to the Database on the IIS Server:
   6.1. Go to the Control Panel →Administrative Tools →Data sources (ODBC)
   6.2. Create the New System DSN:
      6.2.1. 'At the Name;' field input "3diviewDSN"
      6.2.2. At the 'Server:' field input (local) or name of SQL server with the database installed
      6.2.3. Click on the Next button
      6.2.4. Check the radio button 'With SQL server authentication using a login ID and password entered by user'
      6.2.5. Mark the checkbox 'Connect to SQL server to obtain default settings for the additional configuration options'
      6.2.6. Enter Login ID 'sa'
      6.2.7. There is no password (blank)
      6.2.8. Click on the Next button
      6.2.9. Mark the checkbox 'Change the default database to:' and choose "web3diview".
      6.2.10. Mark the checkbox 'Use ANSI quoted identifiers.'
      6.2.11. Mark the checkbox 'Use ANSI nulls, paddings and warnings.'
      6.2.12. Click on the Next button
      6.2.13. Mark the checkbox 'Perform translation for character data'
      6.2.14. Click on the Finish button
      6.2.15. Click Test Data Source button. 'Tests completed successfully' will appear.
      6.2.16. Click OK button
      6.2.17. Click OK button
7. IIS Server configuration:
   7.1. Copy files and their respective directories stored in the <Temp dir>\Kiosk-Site directory created in step 4 to the root directory of the IIS Server.
   7.2. Go to IIS Manager and create virtual directories as listed:

| Virtual Directory Name | Local Path |
|---|---|
| Kiosk | <root>/chain/kiosk |
| Global | <root>/chain/global |
| Includes 1 | <root>/chain/includes |
| Images | <root>/images |
| Frames | <root>/images/frames |
| Faces | <root>/images/faces |

7.3. Go to the properties of each virtual directory:
      7.3.1. Set permissions and execute permissions as listed:
      7.3.2. Mark the checkbox 'enable default document' and Add the script "index.asp" for the 'kiosk' virtual directory under the 'Documents' tab.

Calibration Station

8. Calibrate the six Digital FireFly Video cameras as follows: Provide an Intel compatible computer ("Calibration Station") with a minimum of 128MB RAM and a Pentium IV central processing unit and install the following:
   8.1. one Swan Firewire card available from Swan Communications UK, First Floor, Unit 6 Westmoreland House, Cumberland Park, 80 Scrubs Lane, London NW10 6RE, U.K.
   8.2. Microsoft MS Windows 2000 operating system
   8.3. Active Perl version PerlEx 2.0 or higher version available from ActiveState Vancouver, BC Canada
   8.4. Provide a computer monitor with a screen resolution of 800X600 or higher and connect to the computer mentioned above.
9. Provide a 300mm turntable with a serial cable connection available from Immersion
10. Provide a 6 port Firewire Hub with external power supply available from SIIG, Inc. USA
11. Connect a pair of Digital FireFly Video cameras available from Point Grey, Research Inc., 305-1847 West Broadway, Vancouver, British Columbia V6J 1Y6 to the Firewire card via the Firewire Hub.
12. Within the Device manager ensure these cameras are listed as a "SPGR FireFly Digital Cameras". If they are listed as "PGR FireFly Digital Cameras" skip to step 13 otherwise initiate steps 12.1 through steps 12.4.
   12.1. Select properties for this camera (double click on the camera in the list);
   12.2. Select Driver folder and press the 'Update driver' button.
   12.3. Select "Display list of the known . . . " from the prompt dialog.
   12.4. Click on the 'Have disk' button and install the driver from the CD that came with the Digital FireFly Video camera.
13. Pair Calibration Utility installation:
   13.1. Execute the file 'SETUP.EXE' in the directory <Temp dir>\FaceCapture\PairCalibRC11 created in step 4 and proceed to follow the default prompts.
14. Run "PAIRCALIBRATION.EXE" available through the Microsoft Windows Start Menu.
   14.1. Note, the camera chosen for Camera 0. corresponds to the bottom camera and the camera chosen for Camera 1 corresponds to the top camera.
   14.2. Select the COM port for the Immersion turntable. Note: The COM port number is stored in the registry; the next time the program will be started it will be already selected correctly, unless, of course, the turntable is connected to another COM port.

| Virtue Directory Name | Local Path | Permissions | Execute Permissions | Default Documents |
|---|---|---|---|---|
| Kiosk | <root>/chain/kiosk | Read | Script Only | Index.asp |
| Global | <root>/chain/global | Read | None | <none> |
| Includes 1 | <root>/chain/includes | Read | None | <none> |
| Images | <root>/images | Read | None | <none> |
| Frames | <root>/images/frames | Read | None | <none> |
| Faces | <root>/images/faces | Read | None | <none> |

14.3. Position the calibration target so that it faces the cameras approximately face on (i.e. almost right angle). Press the Calibrate button. Note. If calibration was not successful make sure that the lighting conditions are OK (no saturation) and the turntable is connected to the correct COM port and is turned on.

Note: A successful calibration only indicates that the calibration algorithms did not fail.

14.4. Calibration verification:
14.4.1. Press "check calibration" and verify the results for the epipolar geometry.
14.4.2. Specifically, for a calibration to be considered good, the average needs to be less than one. In addition, if you shake the table and/or move the calibration target and perform check calibration again the average needs to remain below one. You also need to verify this after mounting the pair on the six-camera setup.
14.4.3. If the calibration is not good—one of the following problems may be the reason.
14.4.3.1. the cameras are not mounted rigidly enough on the pair mount;
14.4.3.2. the lens is not tight enough in the lens mount;
14.4.3.3. the pair mount is under different stress when mounted for pair calibration and when mounted on the 6 camera setup;
14.4.3.4. the target may be sliding on the turntable;
14.4.3.5. the pair mount is vibrating on the table during turntable movements;
14.4.3.6. and finally the lens may not be a fit for the specific camera (strange but true), this is usually indicated by a focal-length which is not close to 923 and/or by vastly different results of the average after shaking the camera pair: in this case try a different lens until you get the pair working.
14.5. The relative position and orientation of the cameras can be checked with the "show calibration" button.
14.6. "Last calibrated pair" shows the type of the calibrated pair. This is just for information and should be used to verify that the algorithm identified the type of pair correctly.
14.7. If the calibration is good press the "Save" button and select the directory (which is by default disk A:\) for storing the calibration data. This data will be used later by the System Registration utility.

Note: In the production environment the assumption is made that every pair of Digital FireFly Video cameras comes with a floppy disk which stores its calibration data.

3D Face Capture Station

15. The 3DFC (Face Capture) Station configuration:
15.1. Provide a 3DFC camera assembly system with three mounts available from Visionix, Israel.
15.2. Provide six Digital FireFly Video cameras available from Point Grey Research Inc., 305-1847 West Broadway, Vancouver, British Columbia.
15.3. Provide a 6 port Firewire Hub available from SIIG, Inc. USA 16. Provide an Intel compatible computer ("Calibration Station") with a minimum of 128MB RAM and a Pentium IV central processing unit and install the following:
16.1. one Swan Firewire card available from Swann Communications UK, First Floor, Unit 6 Westmoreland House, Cumberland Park, 80 Scrubs Lane, London NW10 6RE, U.K.
16.2. Microsoft MS Windows 2000 operating system
16.3. Active Perl version PerlEx 2.0 or higher version available from ActiveState Vancouver, BC Canada
16.4. Provide a computer monitor with a screen resolution of 800×600 or higher and connect to the computer mentioned above.

17. FaceCapture installation:
17.1. Execute 'setup.exe' in the directory <Temp dir>\FaceCapture\GoButtonRC11 (RC11 is the version number) on the 3DFC computer
17.2. Default directory for setup ("Setup location") is C:\Program Files\Geometrix\3DiView
17.3. Copy files and subdirectories from the directory <Temp dir>\FaceCapture\VBFC to directory C:\VBFC on the 3DFC computer
17.4. Inside directory of VBFC there is a file param.dat. The parameters inside have to be changed:
17.4.1. First row("serverpath") is a path to directory where the faces will be saved (//servername/sharename/images/faces/3dv)
17.4.2. Second row ("gobuttonpath")—is a path to the directory where "GoButtonRC11was installed. Usually, c:\program files\Geometrix\3DiView"
17.4.3. Last Row ("connectionstring")—ODBC connector used to connect database. Its name is: 3diviewDSN. It is necessary to configure ODBC driver as described in installation process of IIS.

18. System Registration run:
18.1. Start the 3DiView System Registration Utility "SystemRegistration" from Setup location or through the Start Menu.
18.2. For each camera pair press the Load button and browse to a file called "iviewinfo.3di" stored on the floppy disk for this pair or in the directory you chose when running "PairCalibration".
18.3. After you installed the calibration information for all three pairs all pairs are indicated as "Loaded".
18.4. In order to verify the calibration you can select a particular pair position, put the target in front of this pair, and press the "Check Calibration" button. If the check succeeds you'll see a dialog with calibration statistics. All values in this dialog should be within the [0,1] range. If the values are higher you'll need to recalibrate the pair with the Pair Calibration utility.
18.5. To register put the target in front of the cameras. Make sure that it is visible in all six camera views. Press "Register Cameras" button. If registration procedure succeeds you see the calibration information for all the pairs, otherwise the system prompts error message and the registration should be repeated.
18.6. Perform Backplane Calibration—put the backplane calibration target in front of the Center pair on the the Backplane (At least 70 cm from the system), Press the "Calibrate Backplane" button. If this procedure succeeds you see a dialog with the statistics. Otherwise repeat the process with different light conditions.
18.7. After System registration and Backplane Calibration processes are completed the system is ready for capturing faces.
Note: the lighting used for recording the faces is usually adequate for successful registration. In case of Registration "Failure"
Note: If the system has already been installed and you just want to re-register or check the calibration go to step 18.3 .

19. FaceCapture run:
19.1. Press the Windows Start button and click on Run 'C:\VBFC\FaceCapture.exe' and proceed to answer the default prompts and inputs where required.

Virtual Try-on Kiosk

20. Provide an Intel compatible computer with a minimum of 64MB RAM and a Pentium central processing unit and install the following:
  20.1. A Microsoft Windows 2000/98 operating system;
  20.2. A Microsoft Internet Explorer version 4.0 or newer version.
21. Edit the "hosts" file typically located in the "C:\WINNT\system32\drivers\etc\" directory for Windows 2000 or "C:Windows" directory for Windows 98, to include the following line:
  aaa.bbb.ccc.ddd www.iviewtech.com.
  where aaa.bbb.ccc.ddd is the IP address of the computer running the IIS Server (installation step 7).
22. Install ViewPoint Plug in by running "VMPMinimalIstall.exe" from the "<Temp dir\Kiosk-Site\viewpoint>" directory.
23. Use the Microsoft Internet Explorer to browse the site. "www.iviewtech.com/kiosks".

Use the "Full Screen" View. You will get the Login page of the Virtual Try-on program—enter User name and Password to try frames on your face or enter as a "Guest" to try frames on existing models faces.

It is appreciated that the software components of the present invention may, if desired, be implemented in ROM (read-only memory) form, The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A spectacles fitting system comprising:
   a wide-view imaging system operative to provide a wide-view of a client's face;
   a 3D image processor operative to generate first 3D information describing the client's physical features;
   a virtual try-on unit operative to receive a digital 3D representation of the client's face and a digital 3D representation of a spectacle frame, to virtually mount the spectacle frame onto the client's face and to generate second 3D information describing frame/facial fit; and
   a lens fitter operative to receive the first 3D information and the second 3D information and to generate therefrom at least one parameter for face-and-frame customized manufacture and cutting of the lens.

2. The system according to claim 1 wherein the 3D information describing the client's face includes a 3D representation of the client's face.

3. The system according to claim 1 wherein the 3D information describing the client's face includes at least one quantification of at least one biometric facial feature.

4. The system according to claim 3 wherein said at least one biometric facial feature comprises at least one of the following features; temple distance; nosebridge location; and pupil distance.

5. The system according to claim 1 wherein the first 3D information describing the client's physical features comprises 3D information describing the client's face.

6. The system according to claim 1 wherein said first 3D information describing the client's physical features comprises vertex distance information.

7. The system according to claim 1 wherein said second 3D information describing frame/facial fit comprises an indication of the spatial orientation of at least a portion of the frame when mounted on the client's face.

8. The system according to claim 7 wherein said indication of the frame's spatial orientation comprises an indication of the frame's tilt from the horizontal.

9. The system according to claim 7 wherein said indication of the frame's spatial orientation comprises an indication of the arm's tilt vis a vis the frame's optical axis.

10. The system according to claim 1 wherein said at least one parameter for manufacture and cutting of the lens comprises at least one decentration parameter which depends at least partly on said second 3D information describing frame/facial fit.

11. The system according to claim 1 wherein said at least one parameter for face-and-frame customized manufacture and cutting of the lens comprises at least one of the following group of parameters, backsurface-eyeball distance, lens decentration, bifocal lens position, bifocal lens orientation, progressive lens fitting point, lens type.

12. A spectacles fitting system comprising:
   an imaging system operative to provide a 3D view of a client's head and face;
   a 3D image processor operative to generate 3D information describing the client's face; and
   a face/frame/lens fitting unit operative to receive:
     3D face information including at least one of said 3D view and said 3D information; and
     frame mapping information for building an image of different models of spectacles frames,
   the face/frame/lens fitting unit comprising:
     a computerized 3D positioning unit positioning a spectacle frame model from among said models of spectacles frames onto the client's face including simulation of at least one lens parameter characterizing a lens virtually mounted within the frame.

13. The system according to claim 12 and also comprising a binocular representation generator operative to generate a binocular representation of a lens for said spectacle frame and said client's face.

14. The system according to claim 13 wherein said lens parameter comprises the optical center of the lens.

15. A spectacles fitting method comprising:
   providing a wide-view of a client's face;
   generating first 3D information describing the client's physical features;
   receiving a digital 3D representation of the client's face and a digital 3D representation of a spectacle frame, virtually mounting the spectacle frame onto the client's face and generating second 3D information describing frame/facial fit; and
   receiving the first 3D information and the second 3D information and generating therefrom at least one parameter for face-and-frame customized manufacture and cutting of the lens.

16. A spectacles fitting method comprising:
   providing a 3D view of a client's head and face;
   generating 3D information describing the client's face;
   receiving 3D face information including at least one of said 3D view and said 3D information; and frame mapping information for building an image of different models of spectacles frames; and positioning a spectacle frame model from among said models of spectacles frames onto the client's face including simulation of at least one lens parameter characterizing a lens virtually mounted within the frame.

17. A computerized spectacles fitting system comprising:
a computerized display of a multiplicity of spectacle options at least some of which are displayed in association with a display of views of the world as will be seen by the customer through a plurality of different lenses.

18. The system according to claim 17 wherein said plurality of different lenses differ with respect to at least one of the following group of lens characteristics: tint, photochromaticity for weather adaptability, bifocal vs. progressive, antiscratch, antireflection.

19. The system according to claim 17 wherein spectacles options between which a customer is deliberating are displayed simultaneously, each associated with a view of the world which would be produce by the customer's wearing those spectacles.

20. A electronic spectacles purchasing system comprising:
a spectacles display unit operative to store a first plurality of 3D representations of faces and a second plurality of 3D representations of spectacles including frames and to display a 3D image of a selected one of said faces and spectacles to a user; and a frame preselection unit operative to derive face morphology information regarding an individual customer's face from said first plurality of 3D representations of faces and to select a subset of said frames to display to the individual customer, characterized in that the subset of frames are appropriate for the customer's face morphology.

21. The system according to claim 20 wherein the frame preselection unit also preselects frames based on at least one of the following: customer gender, customer age, customer-imposed cost limitations, customer's manufacturer preference.

22. A computerized spectacles fitting system comprising:
a computerized display of a multiplicity of spectacle-face options, each of the displayed spectacle options including a 3D display of a customer's face on which spectacles selected by the customer, including a frame selected by the customer, are mounted, the 3D display including a 3D display of lenses mounted within the spectacles; and a 3D lens building and displaying unit operative to generate the 3D display of lenses based at least partly on imformation regarding the frame selected by the customer.

23. A system according to claim 22 wherein said lens building and displaying unit generates 3D images of lenses based on frame/face fit characteristics.

24. A system according to claim 22 wherein the lens building and displaying unit is operative to virtually apply a customer-selected tint to a 3D image of at least one lens.

25. A system according to claim 22 wherein the lens building and displaying unit is operative to virtually apply a customer-selected coating to a 3D image of a least one lens.

* * * * *